US012214375B2

United States Patent

(12) United States Patent
Lyndon et al.

(10) Patent No.: US 12,214,375 B2
(45) Date of Patent: Feb. 4, 2025

(54) CARTRIDGE HOLDER FOR A DISPENSER

(71) Applicant: Sulzer Mixpac AG, Haag (CH)

(72) Inventors: Matt Lyndon, Hampshire (GB); Malcolm Atkins, Berkshire (GB)

(73) Assignee: medmix Switzerland AG, Haag (CH)

( * ) Notice: Subject to any disclaimer, the term of this patent is extended or adjusted under 35 U.S.C. 154(b) by 236 days.

(21) Appl. No.: 17/638,561

(22) PCT Filed: Jul. 31, 2020

(86) PCT No.: PCT/EP2020/071668

§ 371 (c)(1),
(2) Date: Feb. 25, 2022

(87) PCT Pub. No.: WO2021/037478

PCT Pub. Date: Mar. 4, 2021

(65) Prior Publication Data

US 2022/0288629 A1 Sep. 15, 2022

(30) Foreign Application Priority Data

Aug. 29, 2019 (EP) .................................... 19194461

(51) Int. Cl.
*B05C 17/005* (2006.01)
*B05C 17/01* (2006.01)

(52) U.S. Cl.
CPC .... *B05C 17/0103* (2013.01); *B05C 17/00553* (2013.01); *B05C 17/00569* (2013.01)

(58) Field of Classification Search
CPC ... B05C 17/0053; B05C 17/01; B05C 17/015; B05C 17/0103; B05C 17/00553; B05C 17/00569; B65D 81/325

(Continued)

(56) References Cited

U.S. PATENT DOCUMENTS 3,130,872 A 4/1964 Myers et al.
5,336,014 A * 8/1994 Keller ............... B05C 17/00553 222/137

(Continued)

FOREIGN PATENT DOCUMENTS

CN 1849250 A 10/2006
CN 101466614 A 6/2009

(Continued)

OTHER PUBLICATIONS

International Search Report issued Nov. 9, 2020 in corresponding International Application No. PCT/EP2020/071668.

*Primary Examiner* — Charles P. Cheyney
(74) *Attorney, Agent, or Firm* — Global IP Counselors, LLP

(57) ABSTRACT

A cartridge holder is capable of receiving a first type of cartridge and a second type of cartridge containing viscous material. The cartridges of the first type are different in size from the cartridges of the second type. The cartridge holder has a distal stop for receiving a dispensing end of the cartridges and a proximal receptacle for receiving a rear end of the cartridges. The receptacle is located opposite to the distal stop along a longitudinal axis of the cartridge holder and is movable along the longitudinal axis as well as spring loaded towards the distal stop. Furthermore, the receptacle is configured to contact the rear end of the first type of cartridges at a smaller distance from a rear end of the receptacle than the rear end of the second type of cartridges.

23 Claims, 17 Drawing Sheets

(58) Field of Classification Search
USPC .......................................... 222/137, 327, 389
See application file for complete search history.

(56) References Cited

U.S. PATENT DOCUMENTS

| | | | | |
|---|---|---|---|---|
| 5,341,964 | A * | 8/1994 | Medved .................. B05C 17/01 222/391 | |
| 5,875,928 | A * | 3/1999 | Muller ............... B65D 83/0005 222/137 | |
| 6,290,101 | B1 * | 9/2001 | Chang ............... B05C 17/00553 222/137 | |
| 6,345,626 | B1 | 2/2002 | Bouix | |
| 6,854,621 | B2 * | 2/2005 | Keller ............... B05C 17/00516 222/137 | |
| 8,141,753 | B2 * | 3/2012 | Ostermeier ....... B05C 17/00596 222/326 | |
| 8,857,672 | B2 * | 10/2014 | Naughton ......... B05C 17/00596 222/326 | |
| 8,991,651 | B2 | 3/2015 | Yeh | |
| 9,700,913 | B2 | 7/2017 | Hung | |
| 10,675,653 | B2 | 6/2020 | Tudor | |
| 2007/0287965 | A1 | 12/2007 | Strong et al. | |
| 2011/0138741 | A1 | 6/2011 | Stoeckli et al. | |
| 2012/0118913 | A1 | 5/2012 | Naughton et al. | |
| 2012/0318826 | A1 | 12/2012 | Naughton et al. | |
| 2013/0186912 | A1 | 7/2013 | Yeh | |
| 2013/0189212 | A1 * | 7/2013 | Jawale ..................... A61Q 5/02 514/552 | |
| 2015/0114986 | A1 | 4/2015 | Ngu et al. | |
| 2016/0199872 | A1 * | 7/2016 | Hung ................ B05C 17/00596 222/326 | |
| 2016/0339463 | A1 | 11/2016 | Conner et al. | |
| 2016/0361734 | A1 | 12/2016 | Routen et al. | |
| 2016/0368009 | A1 | 12/2016 | Hatton et al. | |
| 2019/0059915 | A1 | 2/2019 | Karg et al. | |
| 2019/0151887 | A1 | 5/2019 | Grontved | |

FOREIGN PATENT DOCUMENTS

| | | | |
|---|---|---|---|
| CN | 102123797 | A | 7/2011 |
| CN | 203578058 | U | 5/2014 |
| CN | 104590759 | A | 5/2015 |
| CN | 104670603 | A | 6/2015 |
| CN | 106168291 | A | 11/2016 |
| CN | 205762137 | U | 12/2016 |
| CN | 107249754 | A | 10/2017 |
| CN | 107787254 | A | 3/2018 |
| CN | 108435454 | A | 8/2018 |
| CN | 109153034 | A | 1/2019 |

* cited by examiner

CARTRIDGE HOLDER FOR A DISPENSER

CROSS-REFERENCE TO RELATED APPLICATION

This application is a U.S. National Stage application of International Application No. PCT/EP2020/071668, filed Jul. 31, 2020, which claims priority to European Patent Application No. 19194461.0, filed Aug. 29, 2019, the contents of which are hereby incorporated by reference.

FIELD OF THE INVENTION

The present disclosure relates to cartridge holders for dispensers for dispensing viscous material.

BACKGROUND INFORMATION

Conventional dispensers for dispensing viscous materials are used in various technical areas, such as construction engineering, medical, or dental technology, to dispense, for example, viscous adhesives, filling material or sealing compounds. The dispensers usually comprise a cartridge holder for receiving a cartridge containing the viscous material and an actuating means for moving one or more pistons to urge the viscous material out of the cartridge.

SUMMARY

It is usually desirable that, after inserting the cartridge into the cartridge holder of the dispenser, the cartridge is firmly held into place to allow using the dispenser in arbitrary orientations such as upside-down or vertical orientation. To prevent the cartridge from falling out of the cartridge holder, the cartridge can be longitudinally clamped inside the cartridge holder, for example by one or more flexible elements. One prerequisite for clamping the cartridge inside the cartridge holder is that the clamping element firmly engages the cartridge in order to prevent lateral movement perpendicular to the clamping direction. This usually necessitates clamping elements that specifically match the size of the cartridges so that it is not possible to use various types of cartridges with a single dispenser.

Accordingly, it has been determined there is a need to provide cartridge holders and dispensers that are configured to receive various types of cartridges and simultaneously provide for reliable clamping of the cartridges.

The present disclosure provides cartridge holders and a dispenser. Embodiments structures are provided in the description and the drawings.

In one aspect, the present disclosure is directed at a cartridge holder for a dispenser, wherein the cartridge holder is configured to alternately receive at least a first type of cartridges and a second type of cartridges containing the viscous material. The cartridges of the first type are different in size from the cartridges of the second type. The cartridge holder has a distal stop for receiving a dispensing end of the cartridges and a proximal receptacle for receiving a rear end of the cartridges. The receptacle is located opposite to the distal stop along a longitudinal axis of the cartridge holder and is movable along the longitudinal axis as well as spring-loaded towards the distal stop. Furthermore, the receptacle is configured to contact the rear end of the first type of cartridges at a smaller distance from a rear end of the receptacle than the rear end of the second type of cartridges.

The receptacle of the cartridge holder can be configured to transversely stabilize both types of inserted cartridges, i.e. the at least first type of cartridge and the second type of cartridge, at least substantially perpendicular or perpendicular to the longitudinal axis. This aids in ensuring a reliable dispensing from the cartridges on use of the dispenser, as a sideways movement of the cartridges relative to the longitudinal axis can be suppressed in this way.

Since the receptacle contacts the rear end of different types of cartridges at different distances from its rear end, the shape of the receptacle can exhibit longitudinal variations that allow adaption to cartridges of different sizes. Such longitudinal variations can comprise radially tapered sections that accommodate cartridges of different diameter or adapters that are attachable to the front side of the receptacle. Movement of the receptacle along the longitudinal axis then can serve not only for clamping the cartridge, but also for adapting the cartridge holder to different cartridge sizes. Thereby, the different types of cartridges can vary in size along the radial direction and/or along the longitudinal direction.

The receptacle according to the present disclosure therefore adapts in two ways to cartridges of different sizes. First, it can be positioned in its entirety at various positions along its distance of travel along the longitudinal axis. Second, it can receive the cartridges at various distances from its own rear end. If the two types of cartridges both have the same length in the longitudinal direction, receiving the different types of cartridges at different distances from the rear and of the receptacle usually means that the receptacle is placed at different positions along the longitudinal axis when clamping the different types of cartridges.

The receptacle can be configured to receive cartridges having a single compartment. Alternatively, or additionally, it can be configured to receive cartridges having several compartments, in particular two separate compartments. The compartments can be positioned next to each other in a lateral direction perpendicular to the longitudinal axis. The first type of cartridges and the second type of cartridges can comprise compartments with different diameters in the lateral direction. Additionally, or alternatively, the compartments can exhibit different lengths in the longitudinal direction.

The receptacle can have a single part that is only movable along the longitudinal axis in its entirety, it also can have two or more separate parts, each part being movable individually along the longitudinal axis. The individual parts can be configured to each receive a rear end of separate compartments of the cartridges.

The receptacle can be configured to receive the different types of cartridges at varying distances from its rear end by having a locating element that is integrally connected with a base element of the receptacle and receives the rear end of the cartridges. The locating element can have a radially tapered section extending in the longitudinal direction. The receptacle can also be configured to receive the different types of cartridges at varying distances from its rear end by being fitted with different types of adapters, each adapter having a locating element. The individual locating elements of the adapters can contact the rear ends of the cartridges at different distances from the rear end of the receptacle. The adapters can be configured to be alternately attachable to a base element of the receptacle or to a locating element that is provided at the base element.

The cartridges can comprise one or more pistons, each piston urging the viscous material out of the individual compartments at the dispensing end of the cartridges when moving the pistons towards the dispensing end of the cartridges. The dispenser can comprise one or more piston actuators that are movable along the longitudinal direction and are configured to engage with the one or more pistons of the cartridges to move the pistons in the longitudinal direction towards the dispensing end of the cartridges. The piston actuators each can comprise a rod and preferably a plunger arranged at a distal end of the rod.

The receptacle receiving the rear end of the cartridges can have one or more piston actuator openings, whereby each piston actuator opening provides a longitudinal passage through the receptacle for one or more piston actuators. In particular, the receptacle can encompass the piston actuators. The piston actuators openings allow the piston actuators to extend through the receptacle to engage with the pistons of the cartridges while the receptacle itself can remain at its position along the longitudinal axis to firmly hold the cartridge in place. The dispenser can be a manual dispenser having a manual piston actuating device for moving the piston actuators, a motorized dispenser having a motorized piston actuator device, or a pneumatic dispenser having a piston actuator device that can be driven by a pressurized gas, for example air.

According to an embodiment, the receptacle comprises a locating element having a radially tapered section that is configured to at least partly circumferentially surround, for example engage, the rear end of the cartridge. The radially tapered section can extend along the longitudinal axis, so that the radial dimensions of the tapered section vary along the longitudinal axis, for example narrow with increasing distance from the distal stop of the cartridge holder.

The locating element can contact the rear end of cartridges that have different sizes in the lateral or radial direction at different longitudinal locations along its tapered section. Additionally, the radially tapered section can serve to center the cartridges in the radial direction at a longitudinal axis of the locating element and thus to prohibit lateral shifting or skewing of the cartridges after insertion into the cartridge holder. The longitudinal axis of the locating element can be parallel to the longitudinal axis of the cartridge holder. It can be shifted with respect to the longitudinal axis of the cartridge holder, for example in the radial direction. The radially tapered section also allows for adaption to varying sizes of the cartridges in the radial direction that can, for example, result from manufacturing tolerances. The laterally tapered section can surround or engage the rear end of the cartridge at least over a quarter, a third or a half of its circumference.

According to an embodiment, the radially tapered section is configured as a tapered inner side wall of a cavity formed at a front surface of the locating element, the front surface facing the distal stop of the cartridge holder. The cavity can be configured to receive the rear end of the cartridges. It can have an at least partially circular cross-section. At the bottom of the cavity, the piston actuator opening can be provided so that the piston actuator can extend through the cavity into the cartridge.

According to an embodiment, the tapered section has a smooth surface, for example a smooth and at least partly conical surface. In particular, the taper can be free of steps or edges. This enables continuous adaption to and exact centering of cartridges with varying sizes in the radial direction.

According to an alternative embodiment, the tapered section has a stepped surface, for example a stepped and at least partly conical surface. The steps can provide bearing surfaces which the rear ends of the cartridges can lay against and can provide robust support for the cartridges in the longitudinal direction. The bearing surfaces can be oriented perpendicular to the longitudinal axis.

According to an embodiment, the cartridge holder comprises an adapter that is attachable to the receptacle via an attachment structure. The receptacle comprises a first locating element that is configured to contact the rear end of the first type of cartridges and the adapter comprises a second locating element that is configured to contact the rear end of the second type of cartridges. The adapter allows the receptacle to be adapted to different sizes of cartridges over a wide range. The adapter can enable the receptacle to be adapted to cartridges having different sizes in the lateral and/or longitudinal direction. The attachment structure can, for example, be positioned at the first locating element. The first locating element and/or the second locating element can be configured in the same way as it is described for the locating element mentioned above. In particular, the first locating element and/or the second locating element can comprise the radially tapered section.

According to an embodiment, the attachment structure is located at a front surface of the first locating element of the receptacle. Thereby, the adapter can be positioned between the receptacle and the distal stop of the cartridge holder and the adapter can serve to reduce the spacing between the distal stop and the locating element receiving the rear and of the cartridges. In particular, the adapter can cover the first locating element upon attachment to the receptacle.

According to an embodiment, the attachment structure enables a releasable connection of the adapter to the receptacle. Such an attachment structure allows for variable fitting of the receptacle with the adapter.

According to an embodiment, the attachment structure is configured as a clip-in connection. For example, the clip-in connection can allow the adapter being inserted under an angle with respect to a lateral plane that is oriented perpendicular to the longitudinal axis and can prevent lateral movement of the adapter along the lateral plane after insertion. Such a clip-in connection provides a reliable and easy-to-use interface for the adapter.

According to an embodiment, the attachment structure has a lateral pocket that is configured to receive a lateral ridge of the adapter and a lateral stop that is located opposite of the pocket in the lateral direction and that is configured to limit lateral movement of the adapter after insertion of the ridge into the pocket. The adapter can comprise a recess, for example a notch, for receiving the lateral stop of the attachment structure.

According to an embodiment, the adapter is rotatable attachable to the attachment structure, for example upon rotation about its longitudinal axis. Such an attachment structure can comprise a threaded element, for example an inner or outer thread, positioned at the receptacle.

According to an embodiment, the attachment structure is configured as a rotating bayonet fitting. This allows easy attachment of the adapter without the need to turn the adapter several times around its longitudinal axis. The rotating bayonet fitting can be configured to receive the adapter upon rotation by at most 120°, for example at most 90°, 60° or 40° and/or by at least 10°, for example at least 20° or at least 40°.

According to an embodiment, a central longitudinal axis of the second locating element of the attached adapter is laterally shifted with respect to a central longitudinal axis of the first locating element. This allows centering of the cartridges or individual compartments of the cartridges of the first and second type at different positions in the lateral direction. If the cartridges are, for example, configured as two-compartment cartridges, centering the individual compartments of the cartridges at different positions in the lateral direction allows to align the dispensing end of the cartridge, for example an outlet of the cartridges, with the distal stop irrespective of the size of the individual compartments.

According to an embodiment, the first locating element has a first cavity for receiving the rear end of the first type of cartridges and the second locating element has a second cavity for receiving the rear end of the second type of cartridges, wherein the second cavity has a smaller extension perpendicular to the longitudinal axis than the first cavity. The first and second cavity can be configured as described in connection with the cavity mentioned above. For example, the first and/or second cavity can comprise a tapered inner side wall.

According to an embodiment, the receptacle comprises a first part for receiving a rear end of a first compartment of a two-component cartridge and a separate second part for receiving a rear end of a second compartment of the two-component cartridge, wherein the first part and the second part are placed next to each other in a lateral direction that is perpendicular to the longitudinal axis and are independently movable along the longitudinal axis.

Being movable independently from each other along the longitudinal axis, the first and second part of the receptacle can individually adapt to cartridges having compartments of different sizes in the longitudinal and/or lateral direction. The individual parts of the receptacle can each comprise the locating element that has been described above. Additionally, or alternatively, the individual parts can each comprise the attachment structure that has been described above.

According to an embodiment, the first part and the second part form a common cavity for receiving the rear ends of the first and second type of cartridges. This allows for a secure fixation of the cartridges in the cartridge holder. Furthermore, the compartments of the cartridges can be connected together in an interspace between the compartments and the connecting structure can be received inside the common cavity.

According to an embodiment, the cartridge holder comprises at least one first longitudinal rod and at least one second longitudinal rod, wherein the first part is longitudinally guided by the at least one first longitudinal rod and the second part is longitudinally guided by the at least one second longitudinal rod. Thereby, the longitudinal rods extend between a proximal end of the cartridge holder and the distal stop. The first part can, for example, encompass the at least one first rod, but not the at least one second rod, and/or the second part can encompass the at least one second rod, but not the at least one first rod. The longitudinal rods can additionally join the distal stop and the proximal end of the cartridge holder.

According to an embodiment, at least one first spring element spring-loading the first part is located around one of the first longitudinal rods and at least one second spring element spring-loading the second part is located around one of the second longitudinal rods. The spring elements can individually bias the first and second part of the receptacle towards the distal stop of the cartridge holder.

According to an embodiment, the cartridge holder comprises a housing surrounding a distance of travel along which the receptacle is longitudinally movable. This prevents any objects from blocking the distance of travel and minimizes potential injuries of a user of the dispenser.

According to an embodiment, the housing has a front plate with an opening, wherein a portion of the receptacle that is configured to contact the rear end of the cartridges extends through the opening. This facilitates insertion of the cartridges into the receptacle. The opening can additionally provide guidance of the receptacle in the longitudinal direction. The portion of the receptacle that extends through the opening can, for example, be at least a part of the locating element.

In another aspect, the present disclosure is directed at a cartridge holder for a dispenser, the cartridge holder being configured to alternately receive at least a first type of two-component cartridges and a second type of two-component cartridges containing viscous material. The cartridges of the first type are different in size from the cartridges of the second type. The cartridge holder has a distal stop for receiving a dispensing end of the cartridges and a proximal receptacle for receiving a rear end of the cartridges. The receptacle is located opposite to the distal stop along a longitudinal axis of the cartridge holder, while the receptacle is movable along the longitudinal axis and spring-loaded towards the distal stop. The receptacle comprises a first part and a separate second part, wherein the first part is configured to receive a rear end of a first compartment of the two-component cartridges and the separate second part is configured to receive a rear end of a second compartment of the two-component cartridges. The first part and the second part are placed next to each other in a lateral direction that is perpendicular to the longitudinal axis and are independently movable along the longitudinal axis.

The cartridge holder solves the problem of receiving various types of cartridges and simultaneously provides reliable clamping of the cartridges by having a receptacle with two separate and independently movable parts. This allows for insertion of different types of cartridges that have compartments with varying lengths in the longitudinal direction. In particular, the cartridges can have compartments with unequal sizes in the longitudinal direction and a length difference between the compartments in the longitudinal direction can vary across the different type of cartridges, For example, one type of cartridges can have compartments with a first length difference in the longitudinal direction and another type of cartridges can have compartments with a second length difference that differs from the first length difference.

The first part and/or the second part can comprise the locating element and/or the attachment structure described above. Insofar, all technical effects and embodiments of the locating element and/or the attachment structure described above also apply to the receptacle having two separate parts.

In another aspect, the present disclosure is directed at a dispenser for dispensing viscous material having the cartridge holder described above. Insofar, all technical effects and embodiments of the cartridge holder described above also apply to the dispenser.

BRIEF DESCRIPTION OF THE FIGURES

The invention will be explained in more detail hereinafter with reference to the drawings.

DETAILED DESCRIPTION

Figure 1:
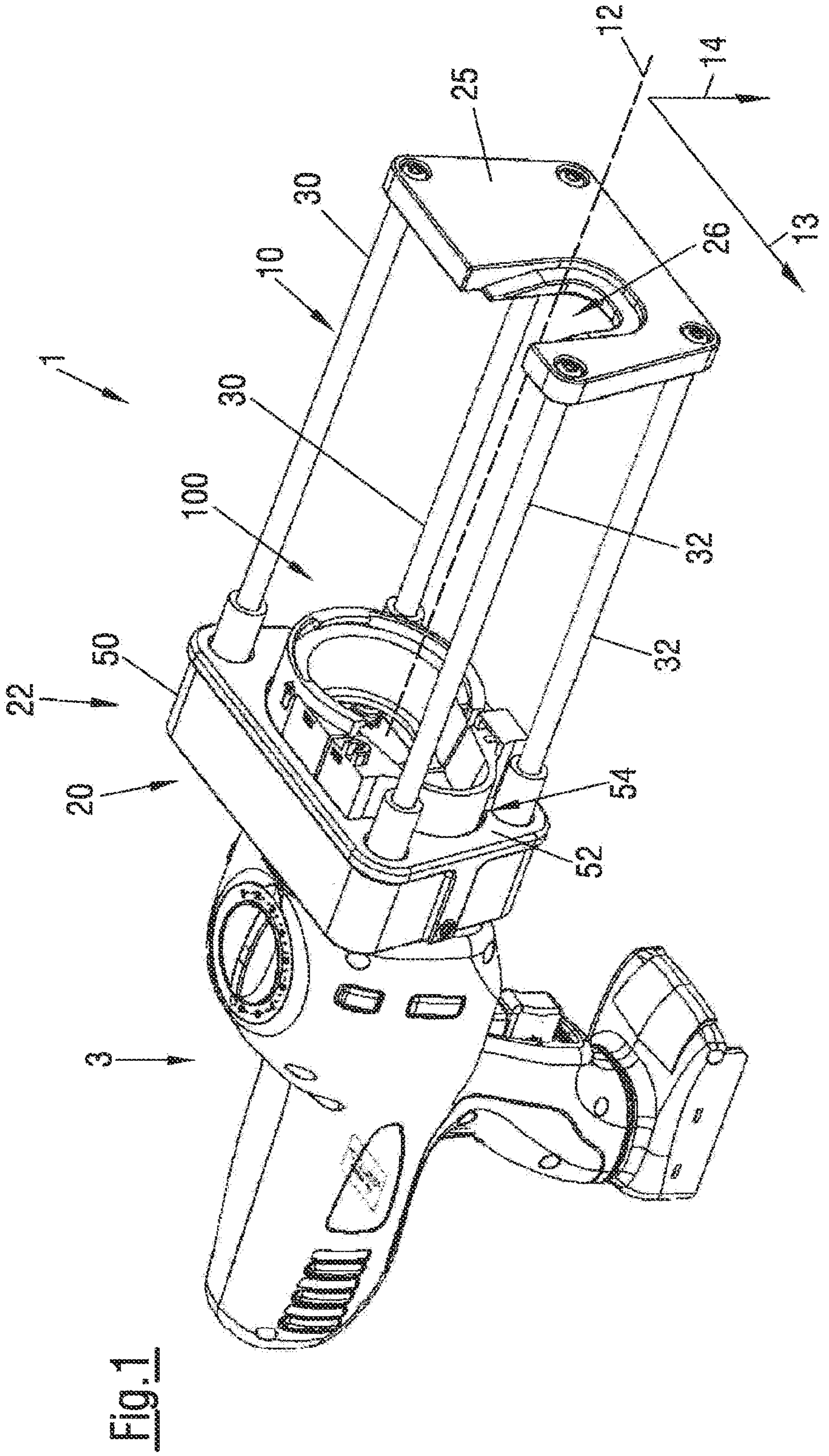
FIG. 1 is a dispenser having a cartridge holder.

FIG. 1 depicts a dispenser 1 having a cartridge holder 10 and a piston actuating device 3. The cartridge holder 10 is configured to hold varying types of cartridges containing viscous material. The cartridge holder 10 has a distal stop 25 and a clamping arrangement 22.

The clamping arrangement 22 is located at a proximal end 20 of the cartridge holder 10 and the distal stop 25 is located opposite to the clamping arrangement 22 along a longitudinal axis 12 of the cartridge holder 10. The distal stop 25 and the clamping arrangement 22 are longitudinally connected by two first longitudinal rods 30 and two second longitudinal rods 32. The second longitudinal rods 32 are located opposite to the first longitudinal rods 30 with respect to a lateral direction 13, whereby the lateral direction 13 is orientated perpendicular to the longitudinal axis 12.

The cartridge holder 10 is configured to receive the cartridges containing the viscous material in the space between the distal stop 25 and the clamping arrangement 22. The distal stop 25 has a cartridge support 26 for receiving a dispensing end of the cartridges, whereby the cartridge support 26 is configured as a radial notch extending along a further lateral direction 14 that is orientated perpendicular to the longitudinal axis 12 and the lateral direction 13. The clamping arrangement 22 comprises a receptacle 100 that is movable along the longitudinal axis 12 and is configured to receive a rear end of the cartridges. Upon insertion, the rear end of the cartridges is placed in the receptacle 100 and the receptacle 100 is moved together with the cartridge away from the distal stop 25 against a restoring force exerted by spring elements (not shown) of the clamping arrangement 22. Subsequently, an outlet of the cartridge that is located at its dispensing end is inserted into the cartridge support 26. After releasing the cartridge, it is clamped towards the distal stop 25 by the spring force of the spring elements.

The clamping arrangement 22 comprises a housing 50 that is covered by a front plate 52 at its front side facing the distal stop 25. The receptacle 100 is placed inside the housing 50 and extends through an opening 54 in the front plate 52 of the housing 50.

The piston actuating device 3 is a motorized actuating device. It is configured to move two piston actuators (not shown) towards the distal stops 25 and to thereby urge the viscous material out of the cartridge. The piston actuators are configured as longitudinal rods that have toothed portions that are connected to an electric motor of the actuating device 3.

Figure 2:
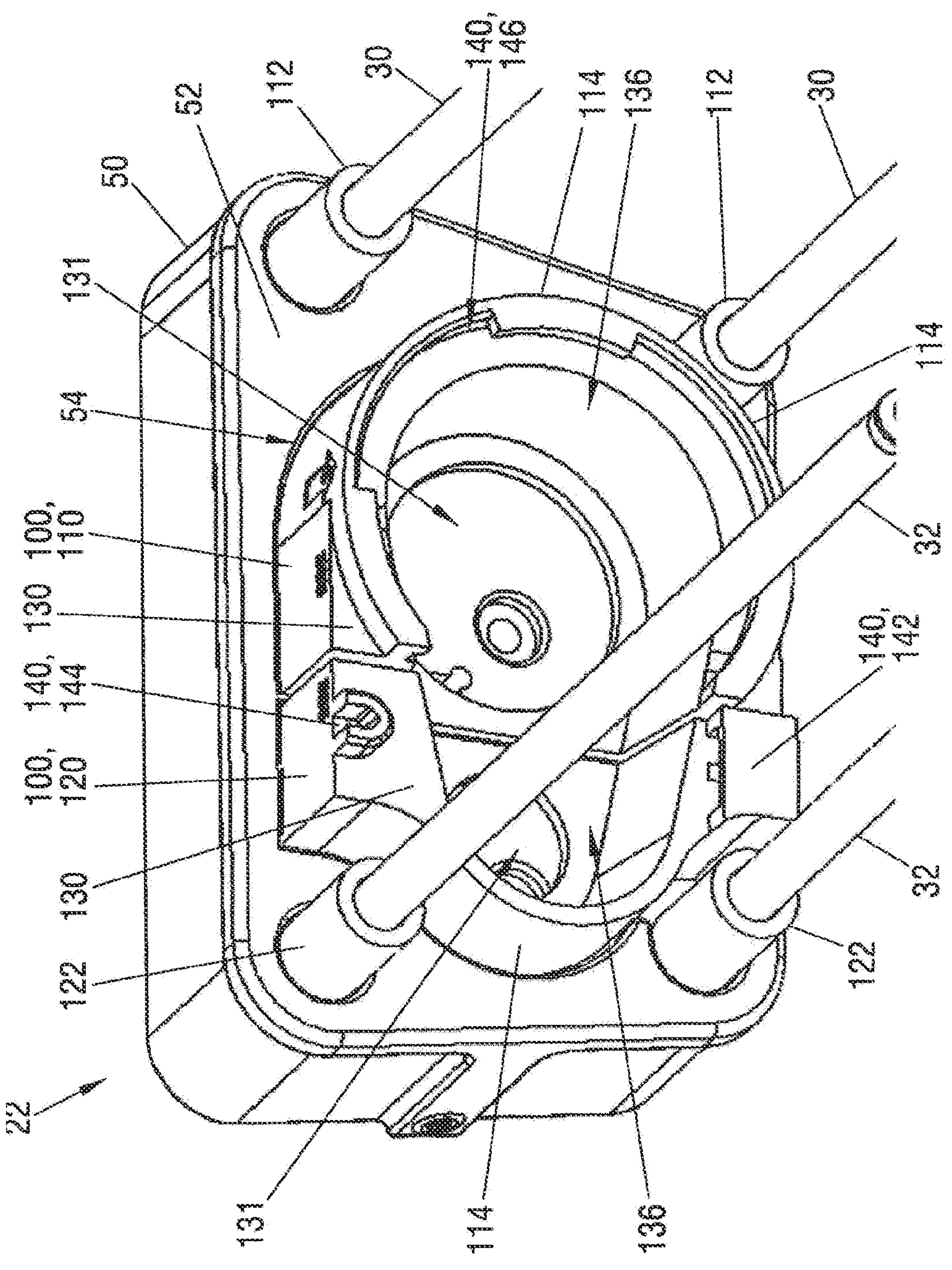
FIG. 2 is a clamping arrangement of the cartridge holder with an receptacle.

FIG. 2. shows the clamping arrangement 22 with the housing 50 and the receptacle 100 extending through the opening 54 of the housing 50. The receptacle 100 is configured to receive cartridges having two separate compartments. The receptacle 100 has a first part 110 for receiving a first compartment and a separate second part 120 for receiving a second compartment of the cartridges. The first part 110 and the second part 120 each comprise a locating element 114 that extends through the opening 54 of the housing 50. Each locating element 114 comprises a cavity 136 at its front surface 130 for receiving the rear end of one of the compartments of the cartridges. At the bottom of each cavity 136, a piston actuator opening 131 is located through which the piston actuators for moving the pistons of the cartridges can extend.

The first part 110 of the receptacle 100 is longitudinally guided by the first rods 30 and the second part 120 is longitudinally guided by the second rods 32. The first part 110 has two first sleeves 112, each first sleeve 112 encompassing one of the first rods 30. Analogously, the second part 120 has two second sleeves 122, each second sleeve 122 encompassing one of the second rods 32. Each individual sleeve 112, 122 extends through a separate opening in the front plate 52 of the housing 50.

At the front side 130, the first and the second part 110, 120 each have an attachment structure 140 for attaching adapters to the receptacle 100. The attachment structure 140 of the first part 110 is configured as a rotating bayonet fitting 146 and the attachment structure 140 of the second part 120 is configured as a clip-in connection. The clip-in connection has a lateral pocket 142 and a lateral stop 144 that are located opposite to each other in a lateral plane spanned by the first and second lateral directions 13, 14. In particular, the lateral pocket 142 and the lateral stop 144 are located opposite to each other in the further lateral direction 14.

Figure 3:
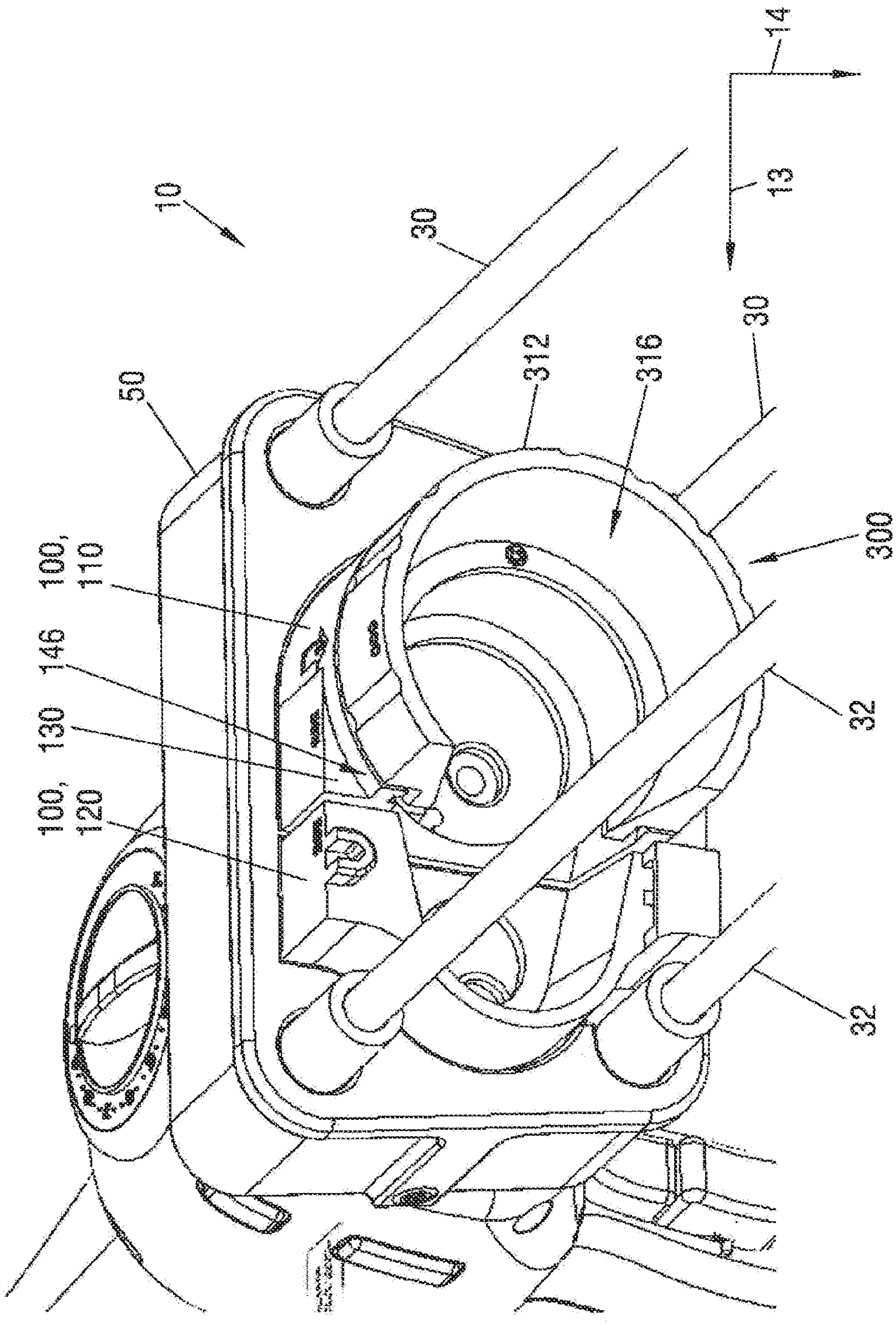
FIG. 3 is the receptacle with a first adapter attached.

FIG. 3 shows a first adapter 300 attached to the first part 110 of the receptacle 100. The first adapter 300 comprises a locating element 312, which has an additional cavity 316 at its front surface. Like the cavity 114 of the locating element 114 of the first part 110 of the receptacle 100, the additional cavity 136 is configured to receive the rear ends of cartridges inserted into the cartridge holder 10. The additional cavity 316 of the first adapter 300 has a larger extension in the lateral directions 13, 14 than the cavity 114 of the first part 110 of the receptacle 100.

Figure 4:
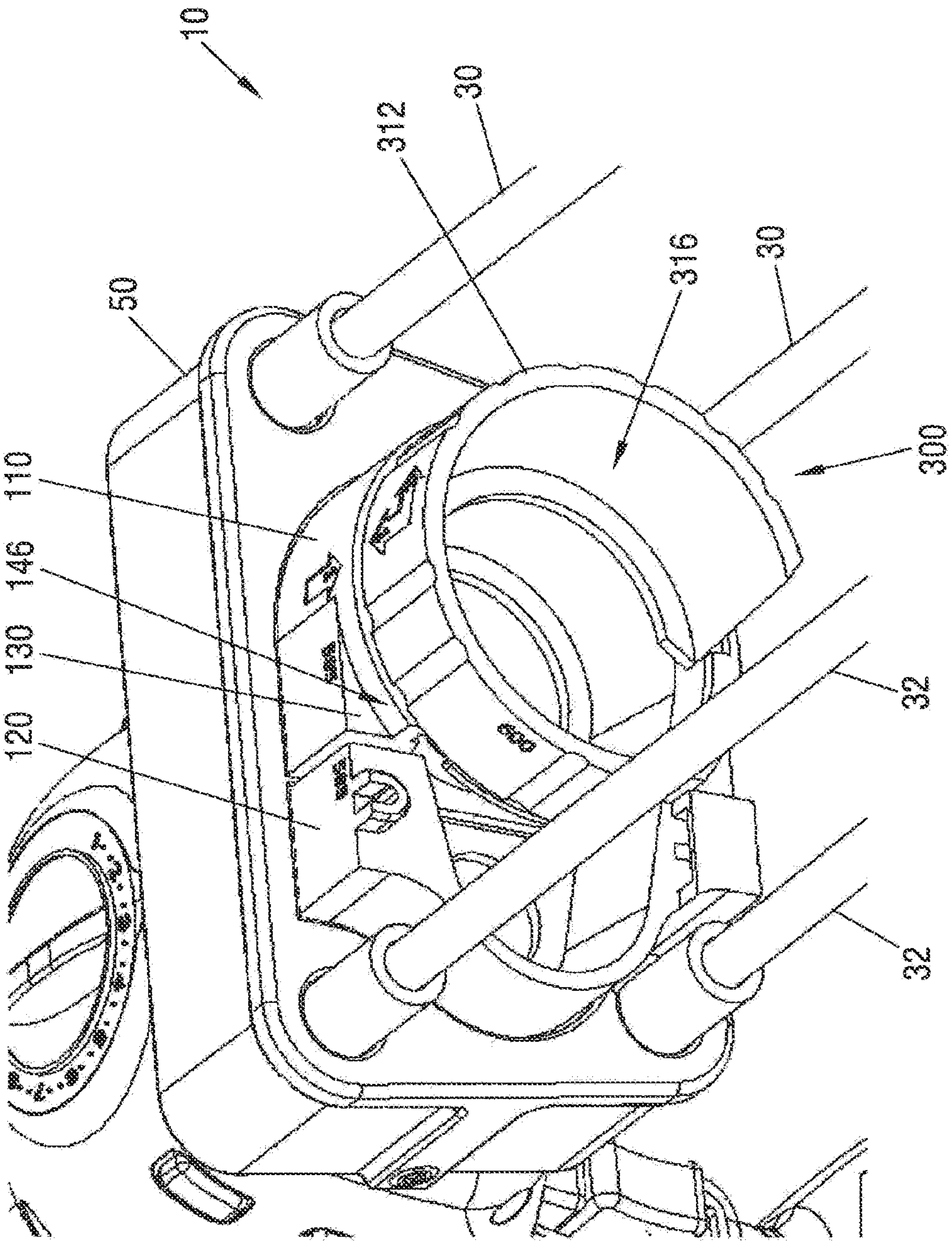
FIG. 4 is the receptacle with the first adapter positioned in an insertion orientation.

The first adapter 300 can be fitted to the rotating bayonet fitting 146 by rotating it around its longitudinal axis. While FIG. 3 shows the first adapter 300 in its locked position, FIG. 4 shows the first adapter 300 in an unlocked position in which it can be removed from the receptacle 100. The first adapter 300 is transferred from the locked position into the unlocked position by rotating it by about 60° around its longitudinal axis.

Figure 5:
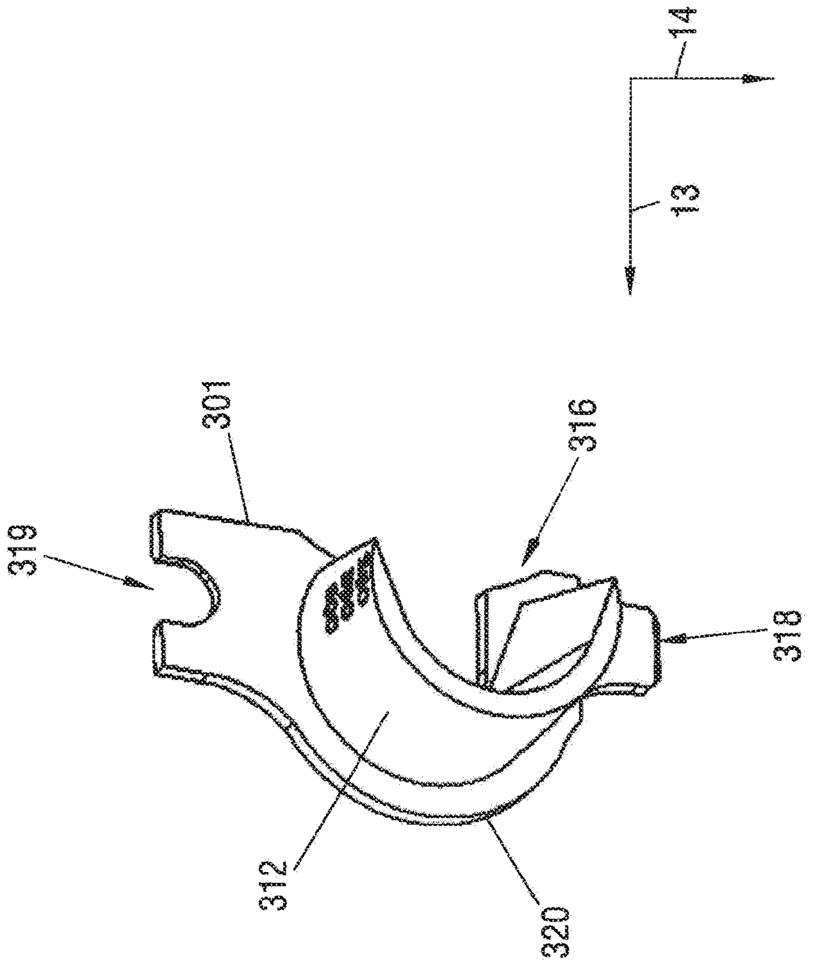
FIG. 5 is a second adapter for the receptacle.

FIG. 5 shows a second adapter 301 that is attachable to the attachment structure 114 of the second part 120 of the receptacle 100. Like the first adapter 300, the second adapter 301 comprises an additional cavity 316 that is formed at a front surface of a locating element 312 of the second adapter 301. The locating element 312 of the second adapter 301 is situated at a back plate 320 of the second adapter 301. The back plate 320 has a lateral ridge 318 extending from the locating element 312 in the lateral plane and a lateral notch 319 that is positioned opposite of the lateral ridge 318 in the lateral plane.

Figure 6:
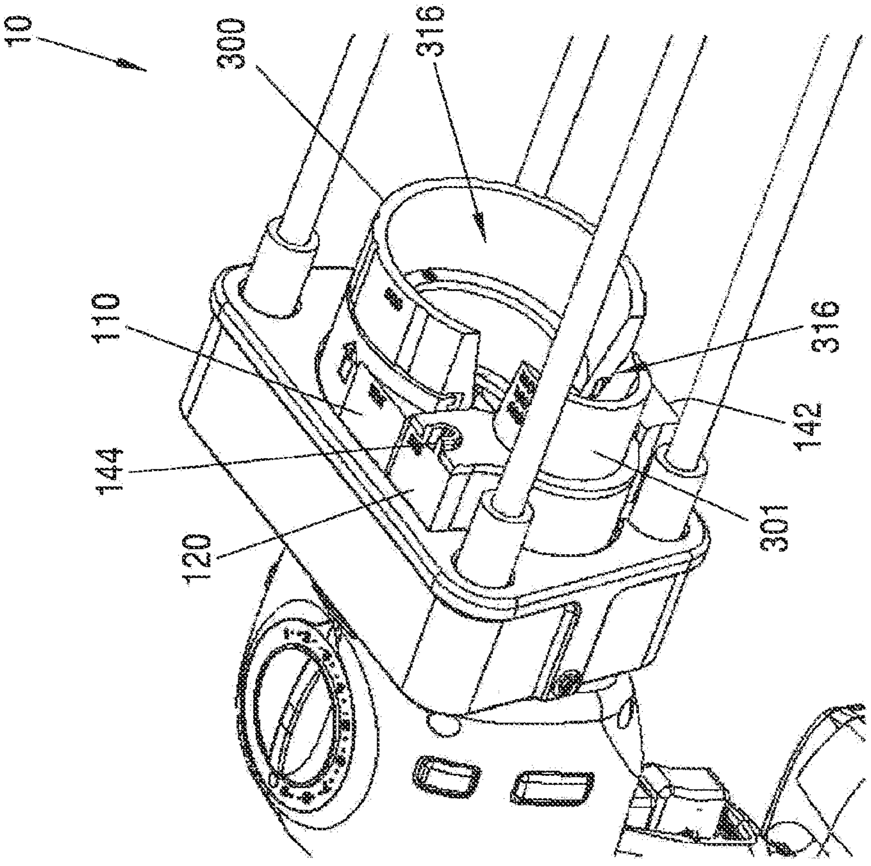
FIG. 6 is the receptacle with the first adapter and the second adapter attached.

As can the seen from FIG. 6, when attaching the second adapter 301 to the second part 120 of the receptacle 100, the lateral ridge 318 is inserted into the lateral pocket 142 and the lateral notch 319 engages with the lateral stop 144 of the attachment structure 140 of the second part 120 of the receptacle 100. Upon attachment of the second adapter 301, the lateral ridge 318 is first inserted into the lateral pocket 142 while keeping the back plate 320 of the second adapter 301 at an angle with the lateral plane defined by the lateral directions 13, 14. Subsequently, the lateral notch 119 is moved over the lateral stop 144 via the back plate 320 while transferring the back plate 320 into parallel alignment to the lateral plane.

Figure 7:
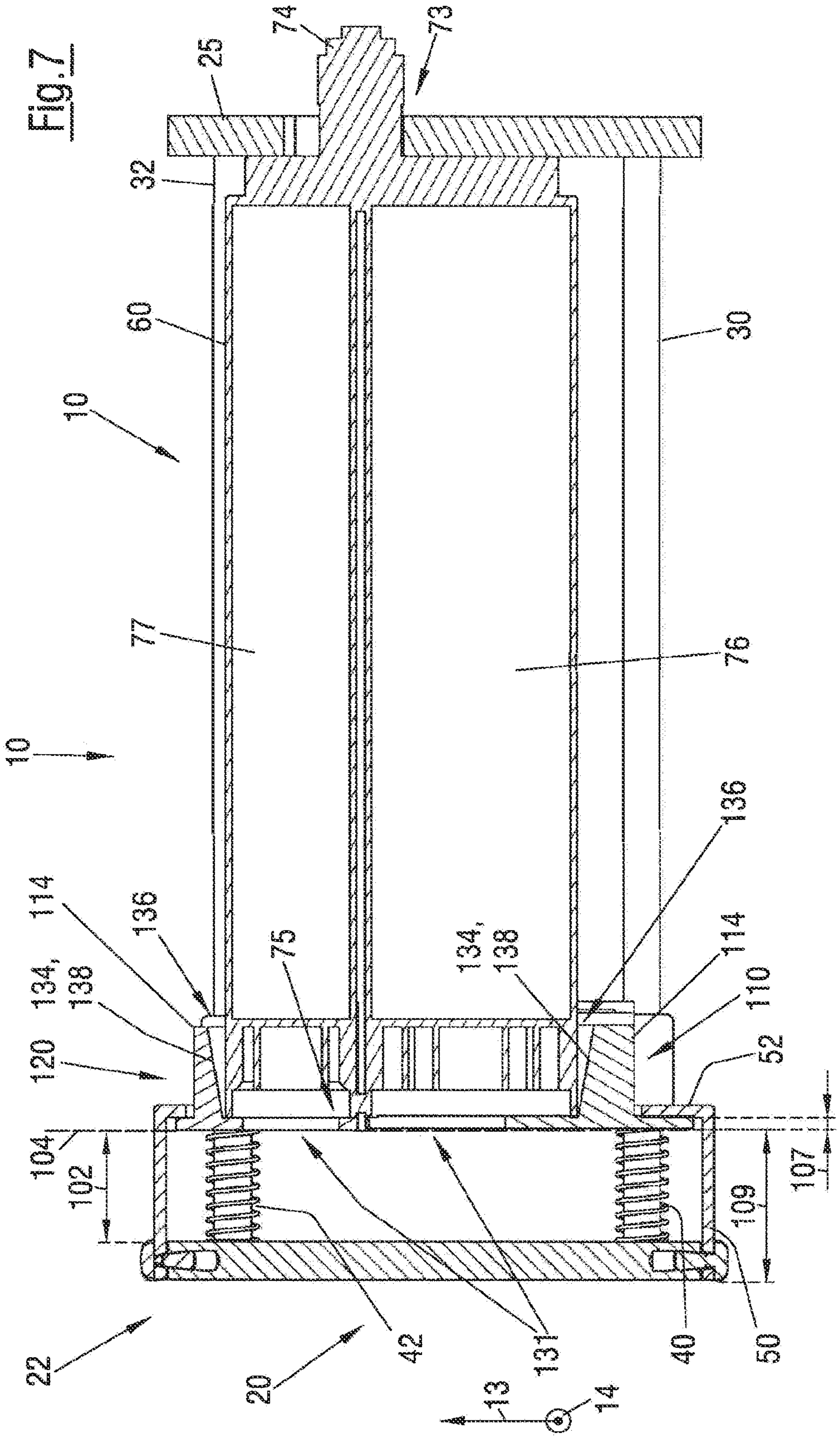
FIG. 7 is a cross-sectional view of the cartridge holder with an inserted cartridge of a first type.

FIG. 7 shows the cartridge holder 10 without the adapters 300, 301 when being equipped with a cartridge 60 of a first type. The cartridge 60 is placed between the distal plate 25 and the receptacle 100 of the clamping arrangement 22. The cartridge 60 has a first compartment 76 and a second compartment 77, each compartment 76, 77 having a circular cross-section in the transverse plane. The compartments 76, 77 lead into an outlet 74 at a dispensing end 73 of the cartridge 60. At their rear end 75 opposite to the dispensing end 73, the first compartment 76 engages with the locating element 114 of the first part 110 of the receptacle 100 and the second compartment 77 engages with the locating element 114 of the second part 110 of the receptacle 100.

Each locating element 114 has a radially tapered section 134 that is formed by an inner side wall 138 of the cavities 136 of the locating elements 114. The radially tapered sections 134 partly surround the rear end 75 of the compartments 76, 77.

In principle, the cartridge holder 10 can be equipped with cartridges that contact the locating elements 114 at bottoms of the cavities 136 or at arbitrary positions along the inner sidewalls 138 of the cavities 136. Since the cartridge 60 contacts the locating elements 114 at the bottom of the cavities 136, a distance 107 between the rear end 75 of the cartridge 60 and a rear end 104 of the receptacle 100 amounts to a minimal possible distance and a separation 109 between the proximal end 20 of the cartridge holder 10 and the rear end 104 of the receptacle 100 amounts to a maximum possible distance.

As can be seen from FIG. 7, the additional cavities 316 of the first adapter 300 and the second adapter 301 form a common cavity receiving the cartridge 60. The two compartments 76, 77 of the cartridge 60 are connected with each other at their rear end 75 by a connecting element. When inserting the cartridge 60 into the cartridge holder 10, the connecting element is placed inside the common cavity.

The cartridge holder 10 can also be equipped with other types of cartridges that have a larger size in the lateral directions 13, 14 than the first type of cartridges 60. In particular, the other types of cartridges can have two compartments, each compartment having a larger diameter than the compartments 76, 77 of the first type of cartridges 60 shown in FIG. 7. By having cavities 136 with tapered inner side walls 138, the receptacle 100 is configured to contact the rear end of the other types of cartridges at a larger distance from the rear end 104 of the receptacle 100 than the first type of cartridges 60. When equipping the cartridge holder 10 with the other types of cartridges, the rear ends of the cartridges contact the tapered side walls 138 in between the front surfaces 130 of the locating elements 114 and the bottom surfaces of the cavities 136.

FIG. 7 also shows a first spring element 40 and a second spring element 42. The first spring element 40 surrounds the first rod 40 and spring-loads the first part 110 of the receptacle 100 towards the distal stop 25, while the second spring element 42 surrounds the second rod 32 and spring-loads the second part 12( )of the receptacle 100 towards the distal stop 25. The spring elements 40, 42 are located inside the housing 50 and the housing 50 surrounds the parts 110, 120 of the receptacle 100 over their distance of travel 102 along the longitudinal axis 12.

Figure 8:
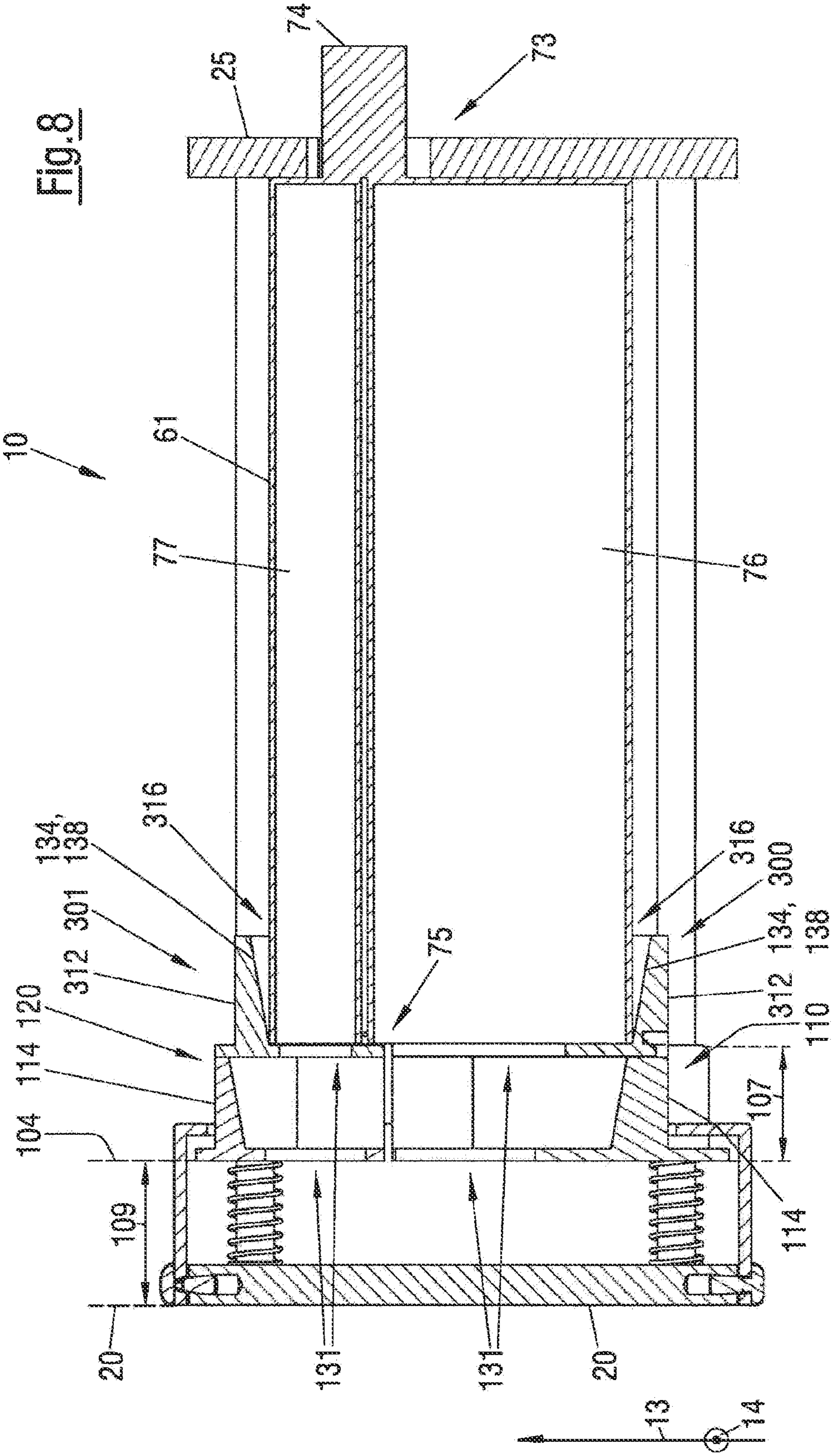
FIG. 8 is a cross-sectional view of the cartridge holder with the first and second adapter attached and an inserted cartridge of a second type.

FIG. 8 shows the cartridge holder 10 with the first adapter 300 and the second adapter 301 and equipped with a cartridge 61 of a second type. As far as no differences are apparent from the description or the drawings, the cartridges 61 of the second type are configured as it is described and shown in connection with the cartridges 60 of the first type. The cartridges 61 of the second type have a smaller size along the longitudinal direction 12 than the cartridges 60 of the first type. Additionally, the first compartment 76 of the second type of cartridges 61 has a larger diameter in the transverse plane than the first compartment 76 of the first type of cartridges 60 and the second compartment 77 of the second type of cartridges 61 has a smaller size in the transverse plane than the second compartment 77 of the first type of cartridges 60.

Fitting the receptacle 100 with the first and second adapter 300, 301 enables using the cartridge holder 10 with the cartridge 61 of the second type irrespective of their shorter length along the longitudinal axis and different sizes in the transverse plane. The cartridge 61 is placed inside the additional cavities 316 of the adapters 300, 301 that together form a common cavity. As can be seen from FIG. 8, the additional cavities 316 each have a tapered inner side wall 138 forming a radially tapered section 134 and the cartridge 61 contacts each adapter 300, 301 at the bottom of its respective additional cavity 316. Compared to the cartridge 60 of the first type shown in FIG. 7, the cartridge 61 of the second type contacts the receptacle 100, in particular its adapters 300, 301, at a greater distance 107 from the rear end of the receptacle 100. Additionally, the receptacle 100 is positioned farther away from the distal stop 25 when clamping the cartridge 61 of the second type instead of the cartridge 60 of the first type. Consequently, the separation 109 between the proximal end 20 of the cartridge holder 10 and the rear end 104 of the receptacle 100 is smaller when clamping the cartridge 61 of the second type than when clamping the cartridge 60 of the first type.

Figure 9:
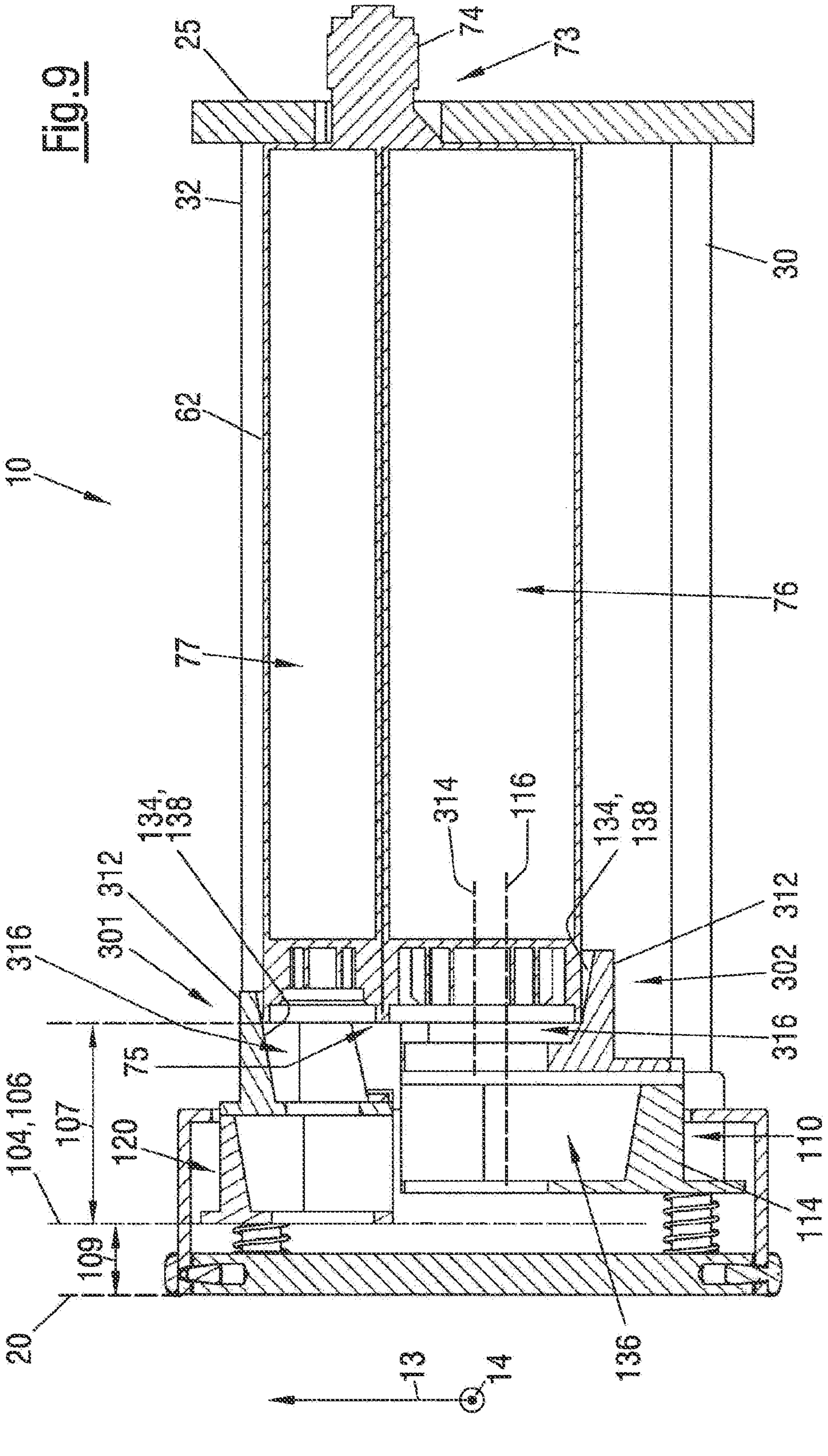
FIG. 9 is a cross-sectional view of the cartridge holder with the second adapter and a third adapter attached and an inserted cartridge of a third type.

FIG. 9 shows the cartridge holder 10 clamping a cartridge 62 of a third type. As far as no differences are apparent from the description or the drawings, the cartridges 62 of the third type are configured as it is described and shown in connection with the cartridges 61 of the second type. Compared with the cartridge 61 of the second type, the first compartment 76 of the cartridges 62 of the third type has a smaller diameter in the transverse plane and the second compartment 77 has a larger diameter in the transverse plane.

For clamping the cartridge 62 of the third type, the first part 110 of the receptacle 100 is equipped with a third adapter 302 and the second part 120 of the receptacle 100 is equipped with the second adapter 301. As far as no differences follow from the description or the figures, the third adapter 302 is configured as it is described and shown for the first adapter 301. Like the first adapter 301, the third adapter 302 has an additional cavity 316 having a smooth and radially tapered inner side wall 138 that forms a radially tapered section 134. The extension of the additional cavity 316 of the third adapter 302 in the transverse directions 13, 14 is smaller than the corresponding extension of the additional cavity 316 of the first adapter 300. Additionally, a central longitudinal axis 314 of the locating element 312 of the third adapter 302 is shifted in the transverse direction 13 with respect to a central longitudinal axis 116 of the locating element 114 of the first part 110 of the receptacle 100. Thereby, the position of the central longitudinal axis 314 of the locating element 312 in the lateral direction 13 is given by the center of the circular part of the additional cavity 316 of the locating element 312 and the position of the central longitudinal axis 116 of the locating element 114 in the lateral direction 13 is given by the center of the circular part of the cavity 136 of the first part 110 of the receptacle 100.

The inner side wall 138 of the additional cavity 316 of the third adapter 302 contacts the rear end 75 of the first compartment 76 of the cartridge 62 and the inner side wall 138 of the second adapter 301 contacts the rear end 75 of the second compartment 77 of the cartridge 62. As can be seen from FIG. 9, the first part 110 and the second part 120 of the receptacle 100 are independently movable along the longitudinal axis 12. When clamping the cartridge 62 of the third type, the second element 120 of the receptacle 100 and the second adapter 301 are located farther away from the distal stop 25 then the first part 110 of the receptacle 100 with the third adapter 302. Therefore, the rear end 104 of the receptacle 100 is in total defined by the rear end 106 of the second part 110 of the receptacle 100. As can be seen from FIG. 9, the distance 107 between the rear end 104 of the receptacle 100 and the rear end 75 of the cartridge 62 of the third type is larger than the distance 107 between the rear end 104 of the receptacle 100 and the rear ends 75 of the cartridges 60, 61 of the first and second type.

Figure 10:
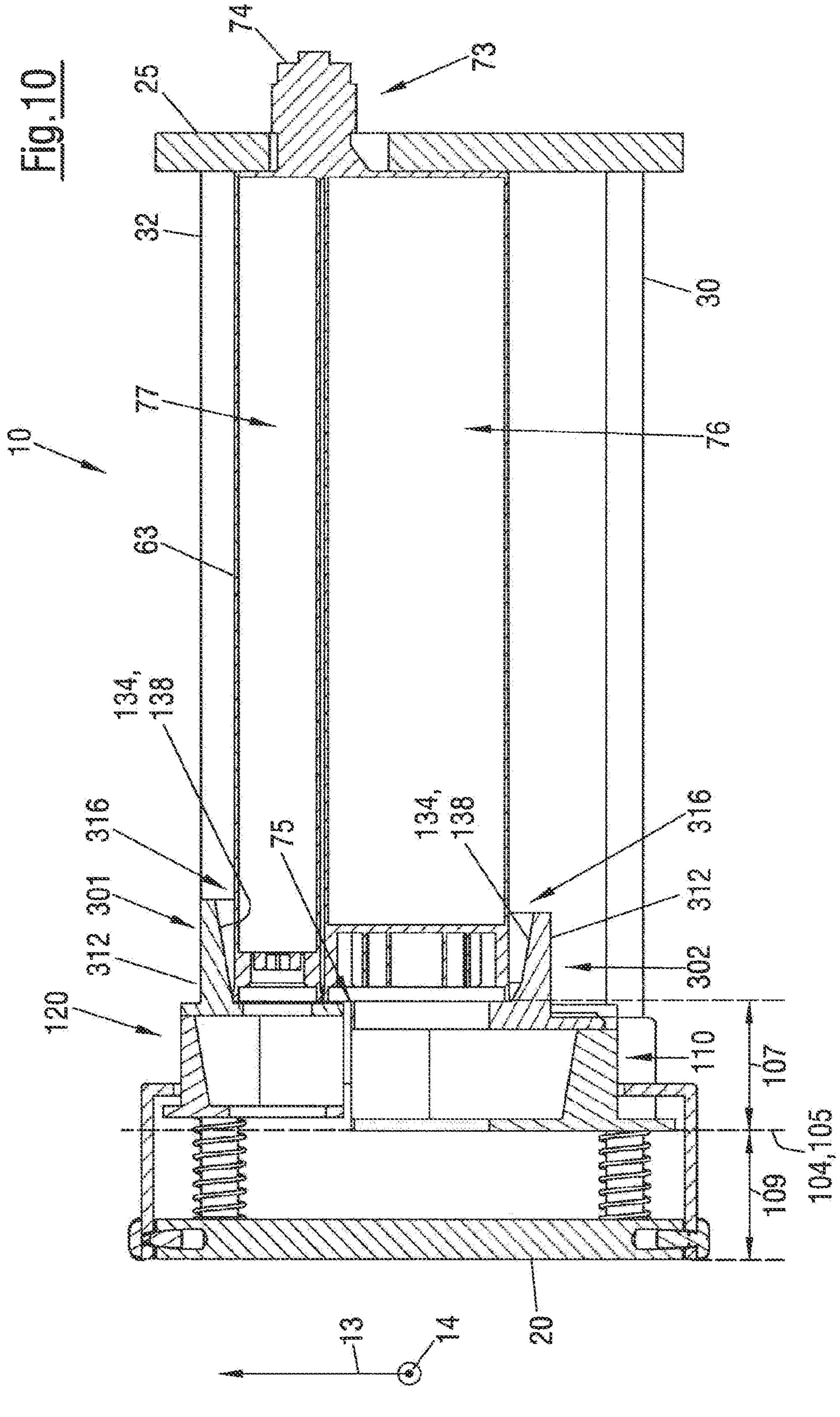
FIG. 10 is a cross-sectional view of the cartridge holder with the second and third adapter attached and an inserted cartridge of a fourth type.

FIG. 10 shows the cartridge holder 10 clamping a cartridge 63 of a fourth type. As far as no differences are apparent from the description or the drawings, the cartridges 63 of the fourth type are configured as it is described and shown in connection with the cartridges 61 of the second type. Compared to the cartridges 61 of the second type, the first compartment 76 of the cartridges 63 of the fourth type has a smaller diameter in the transverse plane, while the diameters of the second compartments 77 are equal.

For clamping the cartridge 63 of the fourth type, the first part 110 of the receptacle 100 is equipped with the third adapter 302 and the second part 120 of the receptacle 100 is equipped with the second adapter 301. Each adapter 301, 302 contacts the rear end 75 of the cartridge 63 of the fourth type at the bottom of its additional cavity 316. As can be seen from FIG. 10, the adapter for the first part 110 of the receptacle 100 and the adapter for the second part 120 of the receptacle 100 can in general have different thicknesses of the bottom sections of their respective additional cavities 316. In particular, the third adapter 302 has an additional cavity 316 with a bottom section that has a greater thickness than the second adapter 301.

Due to the different thicknesses of the bottom parts of the additional cavities 316, the third adapter 302 and the first part 110 of the receptacle 100 are located farther away from the distal stop 25 than the second adapter 301 and the second part 120 of the receptacle 100. Consequently, the distance 107 between the rear end 75 of the cartridge 63 of the fourth type and the rear end 104 of the receptacle 100 is defined by the distance between a rear end 105 of the first part 110 of the receptacle 100 and the rear end 75 of the cartridge 63. When clamping the cartridge 63 of the fourth type, the distance 107 between the rear end 75 of the cartridge 63 and the rear end 107 of the receptacle 100 is larger than with the cartridges 60, 61 of the first and second type, but smaller than with the cartridge 62 of the third type.

Figure 11:
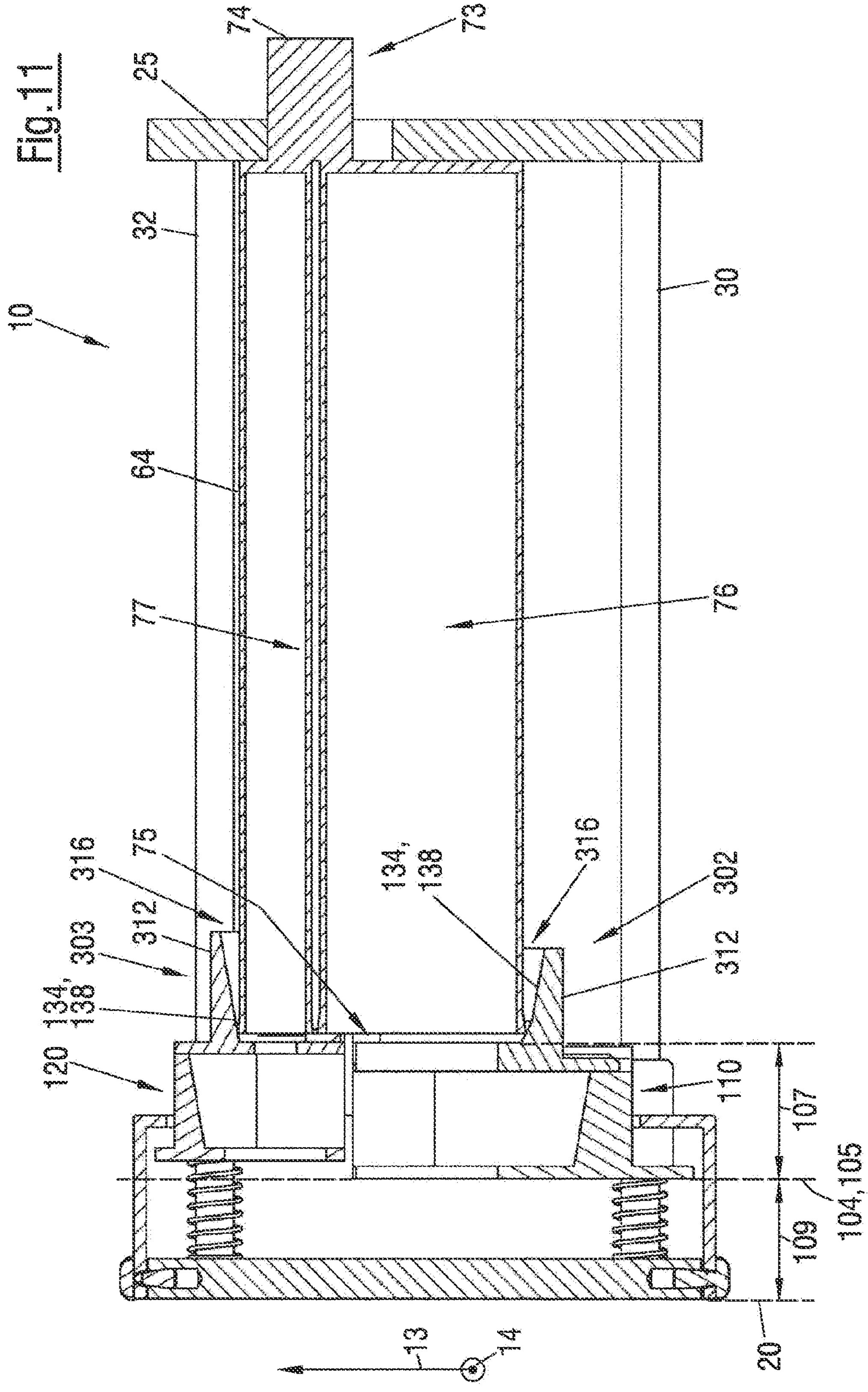
FIG. 11 is a cross-sectional view of the cartridge holder with the third adapter and a fourth adapter attached and an inserted cartridge of a fifth type.

FIG. 11 shows the cartridge holder 10 clamping a cartridge 64 of a fifth type. As far as no differences are apparent from the description or the drawings, the cartridges 64 of the fifth type are configured as it is described and shown in connection with the cartridges 64 of the fourth type. Compared to the cartridges 64 of the fourth type, the cartridge 64 of the fifth type has a second compartment 77 with a smaller diameter in the transverse plane, and a first compartment 76 with a larger diameter in the transverse plane.

For clamping the cartridge 64 of the fifth type, the first part 110 of the receptacle 100 is equipped with the third adapter 302 and the second part 120 of the receptacle 100 is equipped with a fourth adapter 303. Each adapter 302, 303 contacts the rear end 75 of the cartridge 64 of the fifth type at the tapered inner side wall 138 of its additional cavity 316. Thereby, the first part 110 of the receptacle 100 with the third adapter 302 is positioned farther away from the distal stop 25 than the second part 120 of the receptacle 100 with the fourth adapter 303. The rear end 104 of the receptacle 100 is then given by the rear end 105 of the first part 110 of the receptacle 100. When being equipped with the cartridge 64 of the fifth type, the distance 107 between the rear end 104 of the receptacle 100 and the rear and 105 of the cartridge 64 is larger than with the cartridge 63 of the fourth type and smaller than with the cartridge 62 of the third type.

Figure 12:
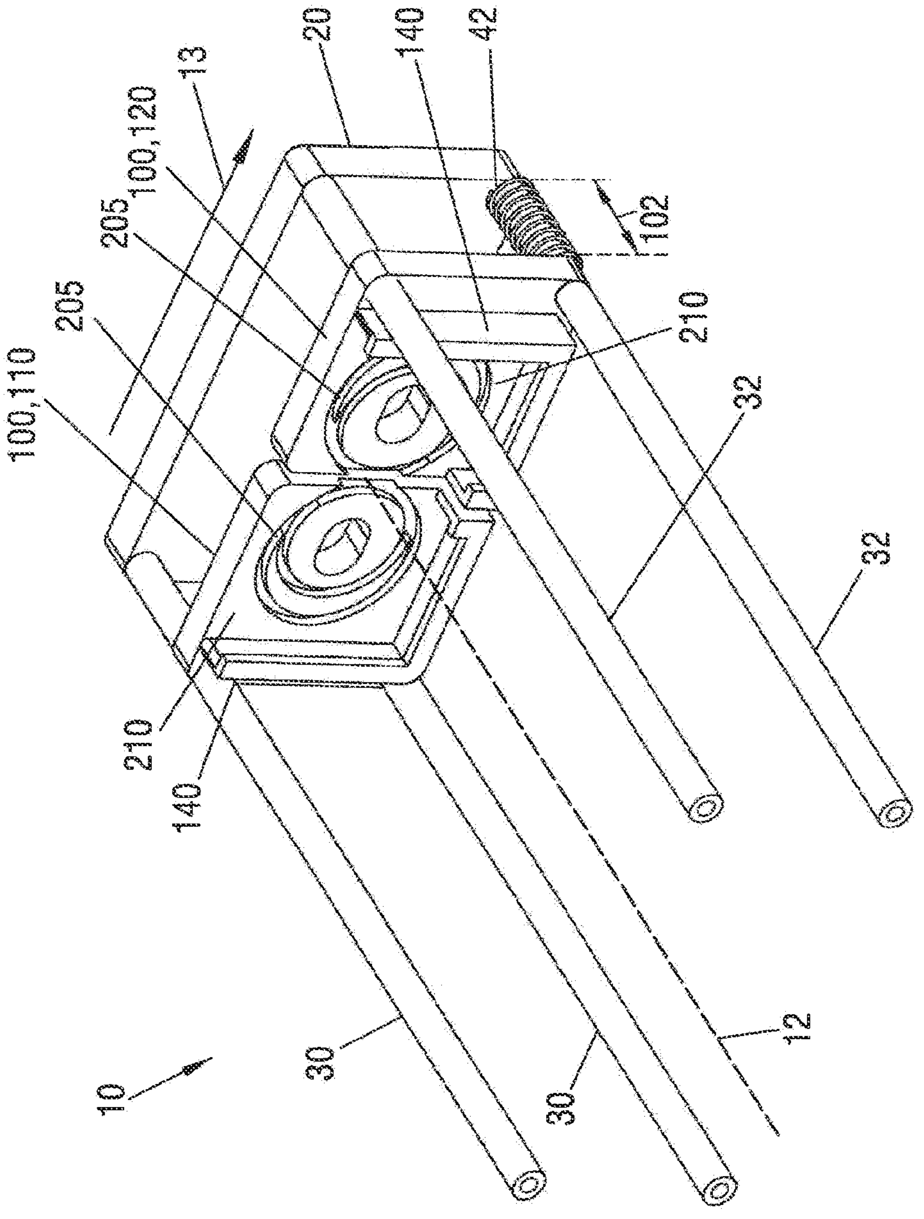
FIG. 12 is the cartridge holder according to an alternative embodiment.

FIG. 12 shows the cartridge holder 10 according to an alternative embodiment. Like the cartridge holder 10 shown in FIGS. 1 to 11, the cartridge holder 10 according to the alternative embodiment has a receptacle 100 with a first part 110 and a separate second part 120, whereby the first part 110 is longitudinally guided by a pair of first rods 30 and the second part 120 is longitudinally guided by a pair of second rods 32. The first part 110 and the second part 120 of the receptacle 100 are independently movable along the longitudinal axis 12. Each part 110, 120 is spring loaded towards the distal stop (not shown) of the cartridge holder 10 by spring elements, but only one spring element 42 is shown in FIG. 12.

The first and second parts 110, 120 of the receptacle 100 are configured as platelike structures that extend perpendicular to the longitudinal axis 12. Locating elements 205 of the first and second parts 110, 112 of the receptacle 100 are configured as grooves that are positioned on the front sides 210 of the first and second parts 110, 120 of the receptacle 100. The grooves have a circular shape with different diameters in the transverse plane and are positioned eccentrically to each other so that they touch near those edges of the first and second parts 110, 120 that face each other.

Figure 13:
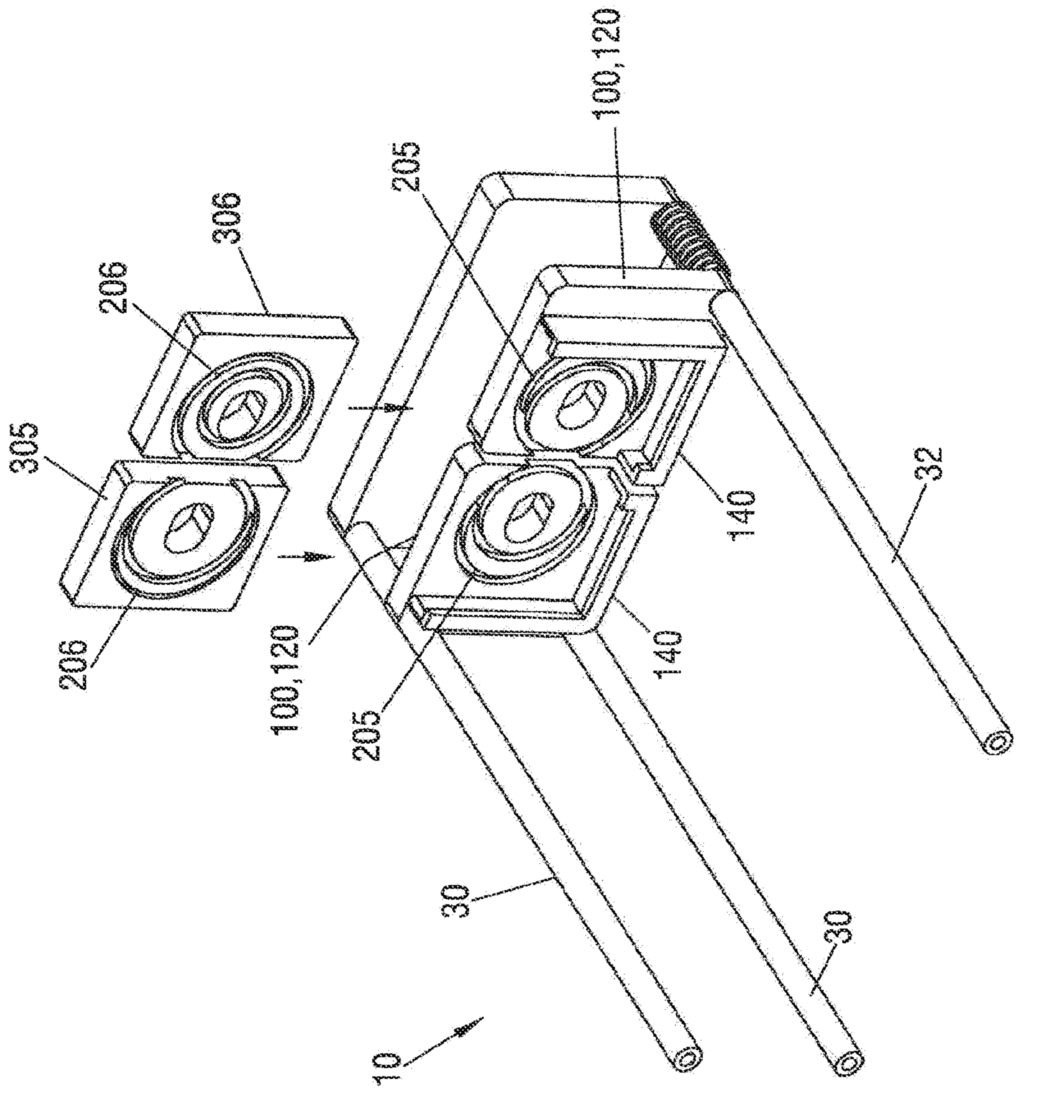
FIG. 13 is the cartridge holder according to the alternative embodiment with two additional adapters.

The first and second parts 110, 112 of the receptacle 100 each comprise an attachment structure 140 for receiving additional adapters 305 as shown in FIG. 13. Each additional adapter 305 is configured as a plate-like structure and has further locating elements 206 positioned on its front side facing the distal stop of the cartridge holder 10. Like the locating elements 205 of the first and second parts 110, 120 of the receptacle 100, the further locating elements 206 of the additional adapters 305 are configured as eccentric circular grooves. The attachment structures 140 are configured as orthogonal ridges that are located at the front sides of the respective part 110, 112 of the receptacle 100 and form notches that encompass the additional adapters 305 at two lateral sides.

Without the additional adapters 305, the second embodiment of the cartridge holder 10 is configured to be fitted with a first type of cartridges, wherein the rear ends of the cartridges are received by the locating elements 205 formed in the first and second part 110, 112. of the receptacle 100. With the additional adapters 305 attached, the cartridge holder 10 is configured to be fitted with a second type of cartridges, wherein the rear ends of the cartridges are received by the further locating elements 206 formed in the additional adapters 305. The first and second types of cartridges can have different sizes in the longitudinal direction 12 and/or in the transverse plane perpendicular to the longitudinal direction 12.

Figure 14:
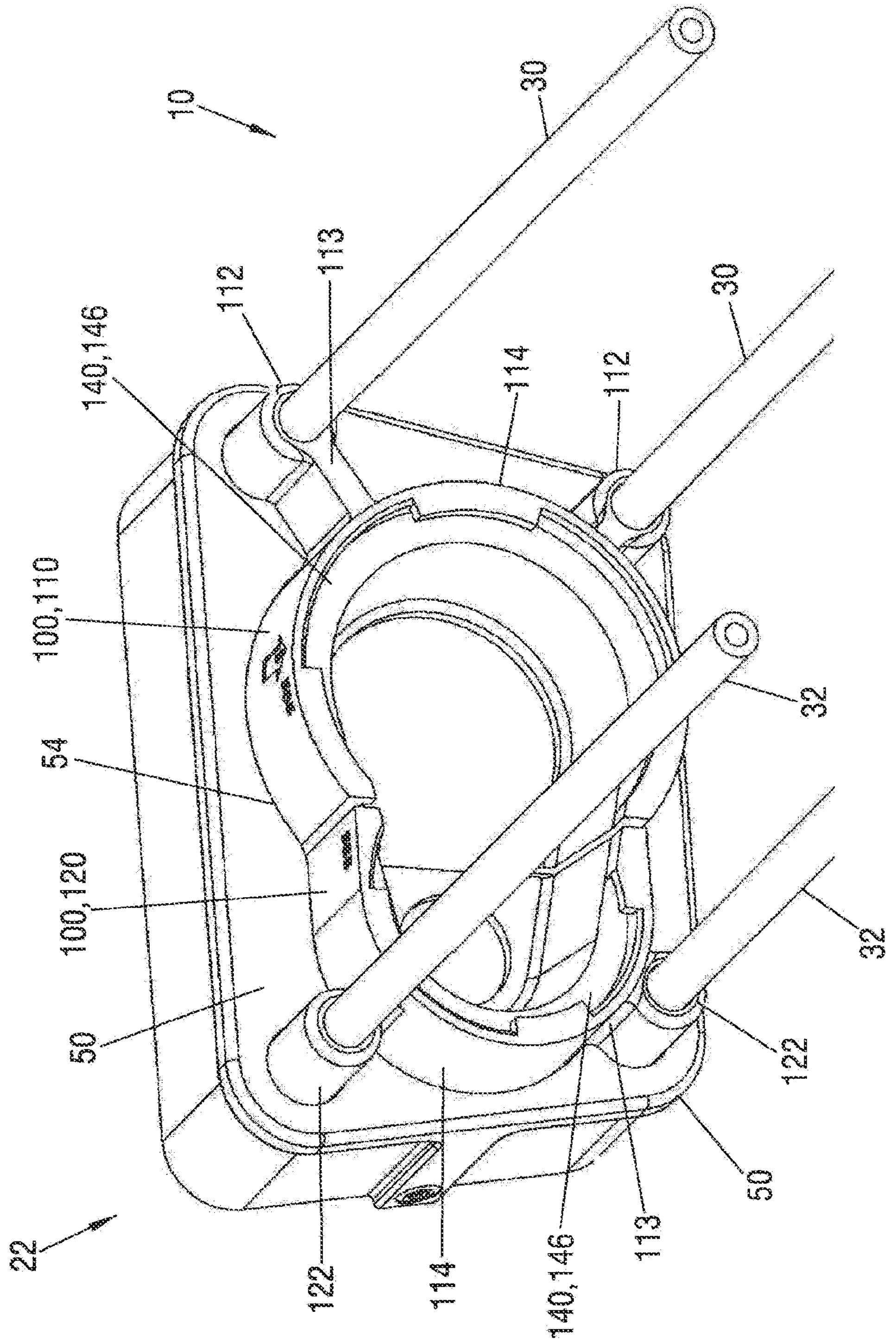
FIG. 14 is the cartridge holder according to another alternative embodiment.

FIG. 14 shows an alternative embodiment of the cartridge holder 10. As far as no differences are described or apparent from the figures, the cartridge holder 10 according to the alternative embodiment can be configured as it is described and shown in connection with the embodiment of the cartridge holder 10 shown in FIGS. 1 to 11.

With the cartridge holder 10 shown in FIG. 14, the locating elements 114 are laterally connected with the sleeves 112, 122 that guide the individual parts 110, 120 of the receptacle 100 along the longitudinal rods 30, 32. Lateral connection between the locating elements 114 and the sleeves 112, 122 is established by individual connection structures 113 that connect the locating elements 114 and the sleeves 112, 122. The locating elements 114 and the sleeves 112, 122 are structurally and integrally connected with each other, in particular, they can be configured, for example molded or casted, as a common and material-uniform component. The connection structures 113 extend along the longitudinal axis into the housing 50 of the clamping arrangement 22 shown in FIG. 14. Thereby, the openings 54 in the front plate 52 of the housing 50 also encompass the connection structures 113.

With the cartridge holder 10 shown in FIG. 14, both the attachment structure 140 of the first part 110 of the receptacle 100 and the attachment structure 140 of the second part 120 of the receptacle 100 are configured to receive adapters that are rotatable attachable to the individual attachment structures 140. In particular, the attachment structures 140 of both the first and second part 110, 120 of the receptacle 100 are configured as rotating bayonet fittings 146. The attachment structure 140 of the first part 110 of the receptacle 100 can be equipped with the first adapter 30( )or the third adapter 302 already described in connection with the cartridge holder 10 shown in FIGS. 1 to 11.

Figure 15:
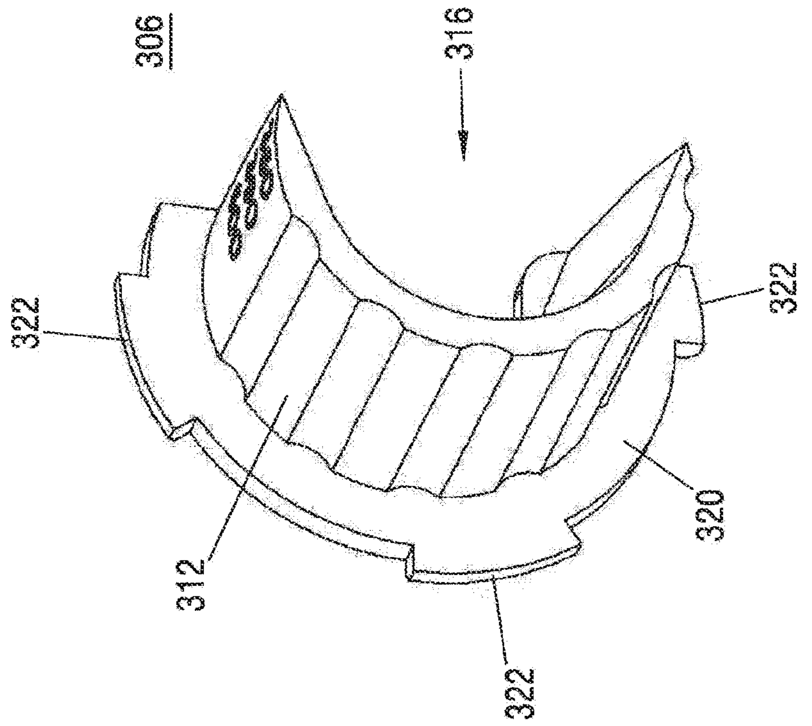
FIG. 15 is a sixth adapter that is connectable to a receptacle of the alternative embodiment of the cartridge holder.

The attachment structure 140 of the second part 120 of the receptacle 100 can be equipped with a sixth adapter 306 that is shown in FIG. 15. The sixth adapter 306 is rotatable attachable to the attachment structure 140 of the second part 120 of the receptacle 100, As far as no differences are described or apparent from the figures, the sixth adapter 306 is configured as described in connection with the second and fourth adapters 301, 303. Instead of a lateral connections structure featuring a lateral ridge 318 and a lateral notch 319, the back plate 320 of the sixth adapter 306 has a lateral connection structure that comprises at least one lateral protrusion 322, in particular three lateral protrusions 322. The lateral protrusions 322 are configured to engage with the rotating bayonet fitting 146 of the second part 120 of the receptacle 100 shown in FIG. 14 upon rotation of the sixth adapter 306 around its longitudinal axis.

Figure 16:
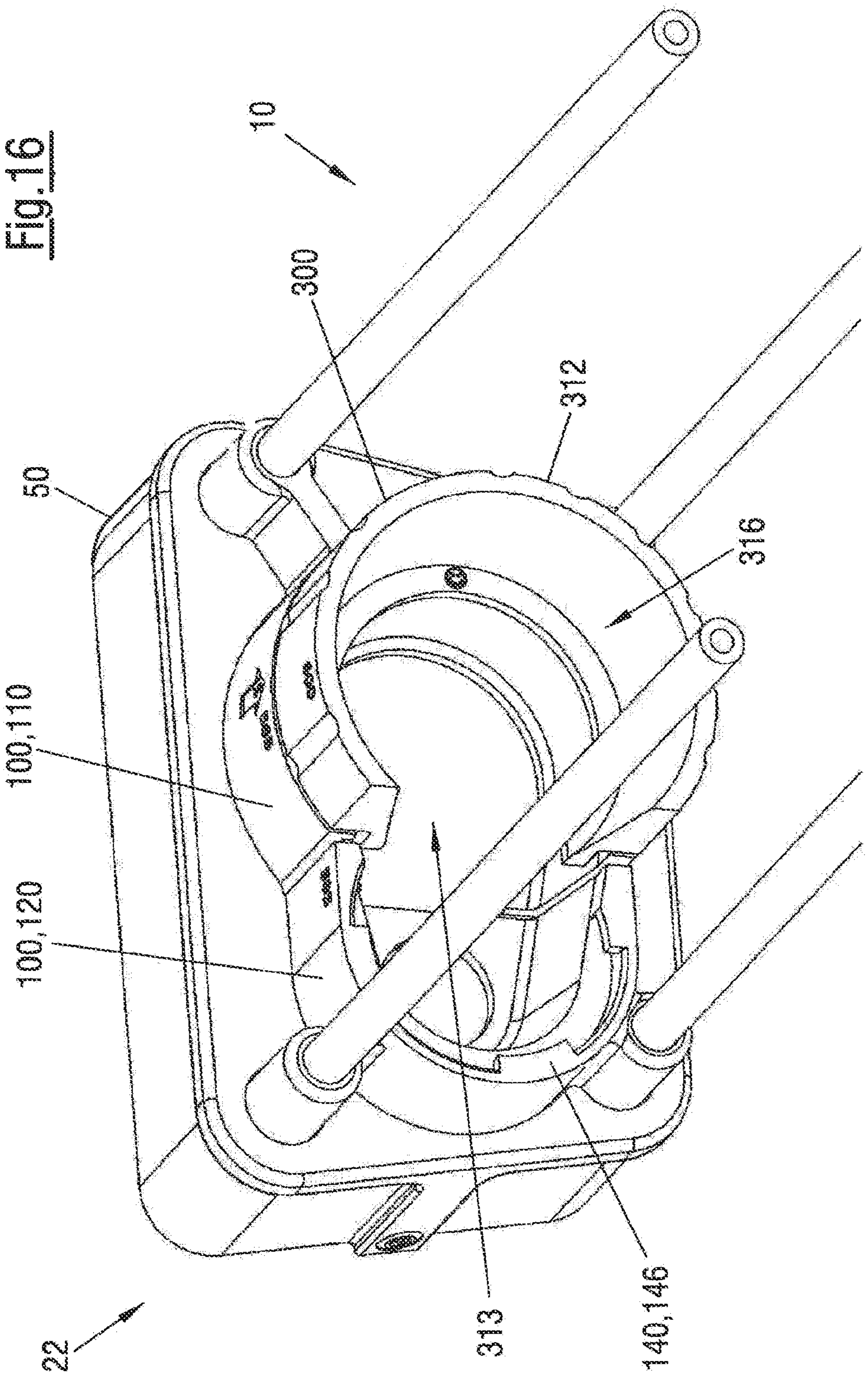
FIG. 16 is the alternative embodiment of the cartridge holder with the first adapter attached to a receptacle of the cartridge holder.

FIG. 16 shows the alternative embodiment of the cartridge holder 10 with the first adapter 300 attached to the first part 110 of the receptacle 100. As can be seen, the locating element 312 of the first adapter 300 has a lateral cutout 313 that is placed next to the second part 120 of the receptacle 100, when the first adapter 300 is attached to the first part 110 of the receptacle 100. The lateral cutout 313 allows the sixth adapter 306 to protrude into the cavity 316 of the locating element 312 of the first adapter 300 when the sixth adapter 306 is inserted into the attachment structure 140 of the second part 120 of the receptacle 100.

Figure 17:
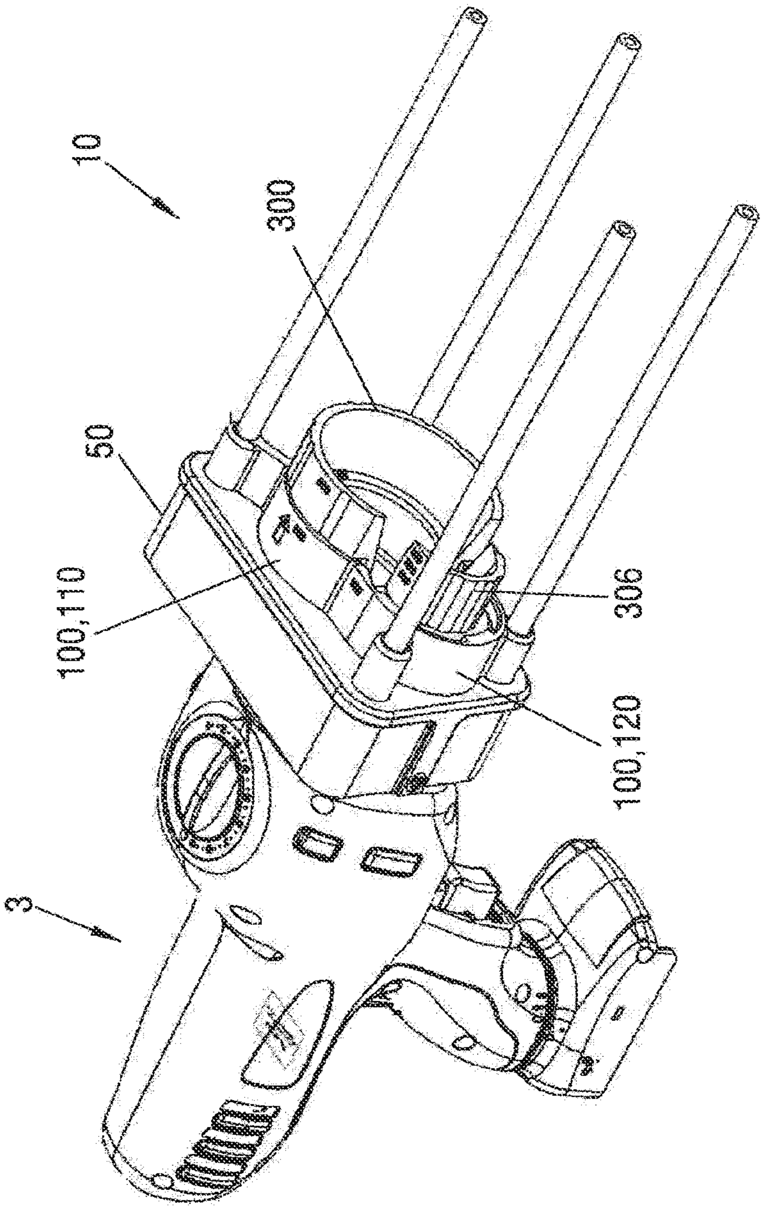
FIG. 17 is the alternative embodiment of the cartridge holder with the first adapter and a sixth adapter attached to the receptacle.

FIG. 17 shows the dispenser 1 equipped with the alternative embodiment of the cartridge holder 10. Thereby, the first adapter 300 is attached to the first part 110 of the receptacle 100 and the sixth adapter 306 is attached to the second part 120 of the receptacle 100.

The cartridge holder 10 has been described as having at least one attachment structure 114 that is configured as rotating bayonet fitting 146, In alternative embodiments of the cartridge holder 10, all attachment structures 140, in particular the attachment structures 140 of both the first part 110 and the second part 120 of the receptacle 100, can be configured as clip-in connections, for example having the lateral pocket 142 and the lateral stop 144 of the attachment structure 140 of the second part 120 of the receptacle 100 shown in FIGS. 1 to 11. Alternatively, the attachment structure 140 of the first part 110 of the receptacle can be configured as the described clip-in connection and the attachment structure 140 of the second part 120 of the receptacle 100 can be configured to have the adapter rotatable attached, in particular by being configured as a rotating bayonet fitting.

In addition, the structural connection between the sleeves 112, 122 and the locating elements 114 can be independently realized from the configuration of the attachment structures 140 of the individual parts 110, 120 of the receptacle. In particular, the embodiment of the cartridge holder 10 shown FIGS. 1 to 11 can comprise the structural connection between the sleeves 112, 122 and the locating elements 114 and the embodiment of the cartridge holder 10 shown in FIGS. 14 to 17 can be configured without the structural connection.

The invention claimed is:

1. A cartridge holder for a dispenser,
- the cartridge holder configured to alternately receive at least a first type of cartridge and a second type of cartridge containing viscous material,
- the first type of cartridge being different in size from the second type of cartridge,
- the cartridge holder comprising:
- a distal stop configured to receive a dispensing end of the first and second type of cartridges;
- a proximal receptacle configured to receive a rear end of the first and second type of cartridges,
- the proximal receptacle located opposite to the distal stop along a longitudinal axis of the cartridge holder,
- the proximal receptacle is movable along the longitudinal axis and spring loaded towards the distal stop, and
- the proximal receptacle being configured to contact a rear end of the first type of cartridge at a smaller distance from a rear end of the proximal receptacle than a rear end of the second type of cartridge; and
- an adapter attachable to the receptacle via an attachment structure,
- the receptacle comprising a first locating element that is configured to contact the rear end of the first type of cartridge, and the adapter comprises a second locating element configured to contact the rear end of the second type of cartridge.

2. The cartridge holder according to claim 1, wherein the proximal receptacle comprises a locating element having a radially tapered section configured to at least partly circumferentially surround the rear end of the first and second type of cartridges.

3. The cartridge holder according to claim 2, wherein the radially tapered section is a tapered inner side wall of a cavity formed at a front surface of the locating element,
the front surface facing the distal stop of the cartridge holder.

4. The cartridge holder according to claim 2, wherein the tapered section has a smooth surface.

5. The cartridge holder according claim 2, wherein the tapered section has a stepped surface.

6. The cartridge holder according to claim 1, wherein the attachment structure is located at a front surface of the first locating element of the receptacle.

7. The cartridge holder according to claim 1, wherein the attachment structure enables a releasable connection of the adapter to the receptacle.

8. The cartridge holder according to claim 1, wherein the attachment structure is a clip-in connection,
that enables the adapter to be inserted under an angle with respect to a lateral plane that is oriented perpendicular to the longitudinal axis, and that prevents lateral movement of the adapter along the lateral plane after insertion.

9. The cartridge holder according to claim 8, wherein the attachment structure has a lateral pocket configured to receive a lateral ridge of the adapter and a lateral stop located opposite of the pocket in a lateral direction and configured to limit lateral movement of the adapter after insertion of the ridge into the pocket.

10. A cartridge holder according to claim 1, wherein the adapter is rotatable attachable to the attachment structure upon rotation about a longitudinal axis thereof.

11. The cartridge holder according to claim 10, wherein the attachment structure is a rotating bayonet fitting.

12. The cartridge holder according to claim 1, wherein a central longitudinal axis of the second locating element of the adapter when attached is laterally shifted with respect to a central longitudinal axis of the first locating element.

13. The cartridge holder according to claim 1, wherein the first locating element has a first cavity configured to receive the rear end of the first type of cartridge and the second locating element has a second cavity configured to receive the rear end of the second type of cartridge, and
the second cavity has a different extension perpendicular to the longitudinal axis than the first cavity.

14. The cartridge holder according to claim 1, wherein at least one of the first type and the second type of cartridges is a two component cartridge and the receptacle comprises a first part configured to receive a rear end of a first compartment of the two-component cartridge and a separate second part configured to receive a rear end of a second compartment of the two-component cartridge,
the first part and the second part are placed next to each other in a lateral direction perpendicular to the longitudinal axis, and
the first part and the second part are independently movable along the longitudinal axis.

15. The cartridge holder according to claim 14, wherein the first part and the second part form a common cavity for receiving the rear ends of the first and second type of cartridges.

16. A cartridge holder according to claim 14, wherein the cartridge holder comprises a first longitudinal rod and a second longitudinal rod,
the first part is longitudinally guided by the first longitudinal rod and the second part is longitudinally guided by the second longitudinal rod, and
the first and second longitudinal rods extend between a proximal end of the cartridge holder and the distal stop.

17. The cartridge holder according to claim 16, wherein a first spring element spring-loading the first part is located around the first longitudinal rod and a second spring element spring-loading the second part is located around he second longitudinal rod.

18. The cartridge holder according to claim 1, further comprising
a housing surrounding a distance of travel along which the receptacle is longitudinally movable.

19. The cartridge holder according to claim 18, wherein the housing has a front plate with an opening, and
a portion of the receptacle that is configured to contact the rear end of the first and second type of cartridges extends through the opening.

20. A cartridge holder for a dispenser,
the cartridge holder being configured to alternately receive at least a first type of two component cartridges and a second type of two-component cartridges containing viscous material,
the first type of cartridges of the first type being different in size from the second type of cartridges,
the cartridge holder comprising:
a distal stop configured to receive a dispensing end of the first and second type of cartridges and a proximal receptacle for receiving a rear end of the first and second type of cartridges,
the receptacle located opposite to the distal stop along a longitudinal axis of the cartridge holder,
the receptacle being movable along a longitudinal axis and spring loaded towards the distal stop,
the receptacle comprising a first part and a separate second part,
the first part configured to receive a rear end of a first compartment of the two-component cartridges and the separate second part configured to receive a rear end of a second compartment of the two component cartridges,
the first part and the second part placed next to each other in a lateral direction that is perpendicular to the longitudinal axis, and
the first part and the second part independently movable along the longitudinal axis.

21. The cartridge holder according to claim 20, wherein the receptacle configured to transversely stabilize both the first and second types of cartridges at least substantially perpendicular or perpendicular to the longitudinal axis.

22. A dispenser for dispensing viscous material, comprising:
the cartridge holder according to claim 1.

23. A cartridge holder for a dispenser, the cartridge holder configured to alternately receive at least a first type of cartridge and a second type of cartridge containing viscous material, the first type of cartridge being different in size from the second type of cartridge, the cartridge holder comprising:

a distal stop configured to receive a dispensing end of the first and second type of cartridges; and a proximal receptacle configured to receive a rear end of the first and second type of cartridges, the proximal receptacle located opposite to the distal stop along a longitudinal axis of the cartridge holder, the proximal receptacle is movable along the longitudinal axis and spring loaded towards the distal stop, and the proximal receptacle being configured to contact a rear end of the first type of cartridge at a smaller distance from a rear end of the proximal receptacle than a rear end of the second type of cartridge, the receptacle having longitudinally extending first and second tapered sections, the first and second tapered sections configured to at least partly circumferentially surround the rear end of the first and second type of cartridges, respectively, by a form fit to transversely stabilize both the first and second types of cartridges at least substantially perpendicular or perpendicular to the longitudinal axis.

* * * * *